(12) United States Patent
Yokoyama

(10) Patent No.: US 10,592,177 B2
(45) Date of Patent: Mar. 17, 2020

(54) PRINT SYSTEM, PRINTING APPARATUS, METHOD OF CONTROLLING THE PRINTING APPARATUS, AND STORAGE MEDIUM THAT GENERATE PRINT DATA TO BE PRINTED USING RENDERED PRINT DATA

(71) Applicant: CANON KABUSHIKI KAISHA, Tokyo (JP)

(72) Inventor: Hidehiko Yokoyama, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/047,587

(22) Filed: Jul. 27, 2018

(65) Prior Publication Data
US 2019/0034137 A1    Jan. 31, 2019

(30) Foreign Application Priority Data
Jul. 31, 2017   (JP) ................. 2017-148202

(51) Int. Cl.
  *G06F 3/12*   (2006.01)
  *H04N 1/00*   (2006.01)

(52) U.S. Cl.
  CPC .......... *G06F 3/1238* (2013.01); *G06F 3/1211* (2013.01); *G06F 3/1247* (2013.01); *G06F 3/1258* (2013.01); *G06F 3/1267* (2013.01); *G06F 3/1285* (2013.01); *G06F 3/126* (2013.01); *G06F 3/1222* (2013.01); *G06F 3/1269* (2013.01); *H04N 1/00209* (2013.01)

(58) Field of Classification Search
  CPC .... G06F 3/1238; G06F 3/1211; G06F 3/1285; G06F 3/1247; G06F 3/1258; G06F 3/1267; G06F 3/1269; G06F 3/126; G06F 3/1222; H04N 1/00209
  See application file for complete search history.

(56) References Cited

U.S. PATENT DOCUMENTS

| | | | |
|---|---|---|---|
| 9,372,648 B2 * | 6/2016 | Nakajima | G06F 3/1238 |
| 2006/0028678 A1 | 2/2006 | Negishi et al. | |
| 2010/0253964 A1 * | 10/2010 | Isshiki | G06F 3/1203 358/1.14 |
| 2016/0292544 A1 * | 10/2016 | Hasegawa | G06F 3/1248 |
| 2017/0054859 A1 * | 2/2017 | Zehler | H04N 1/00244 |

FOREIGN PATENT DOCUMENTS

JP    2005-242735 A    9/2005

\* cited by examiner

*Primary Examiner* — Neil R McLean
(74) *Attorney, Agent, or Firm* — Venable LLP

(57) ABSTRACT

A printing apparatus receives a print job including print data held in a storage, performs processing of rendering of the print data, and generates, after a print instruction for the print job is input, print data to be printed based on the rendered print data. In a case in which print settings for the print job change from first print settings to second print settings, while the print job is held, first rendered print data and second rendered print data are generated based on the print data. The first rendered print data is not used for generating the print data to be printed, and the second rendered print data is used for generating the print data to be printed. In addition, the first rendered print data is generated in accordance with the first print settings, and the second rendered print data is generated in accordance with the second print settings.

15 Claims, 23 Drawing Sheets

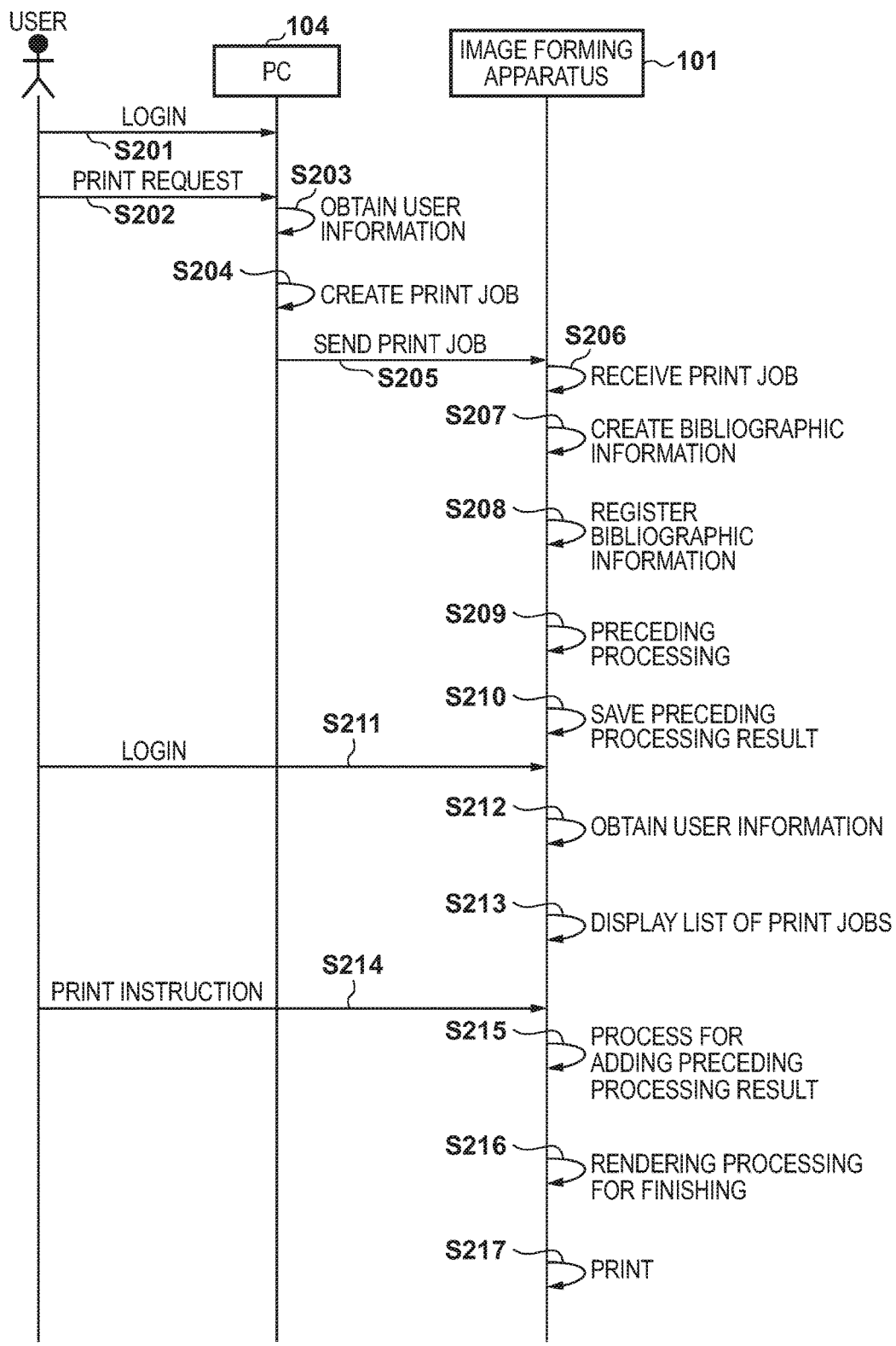

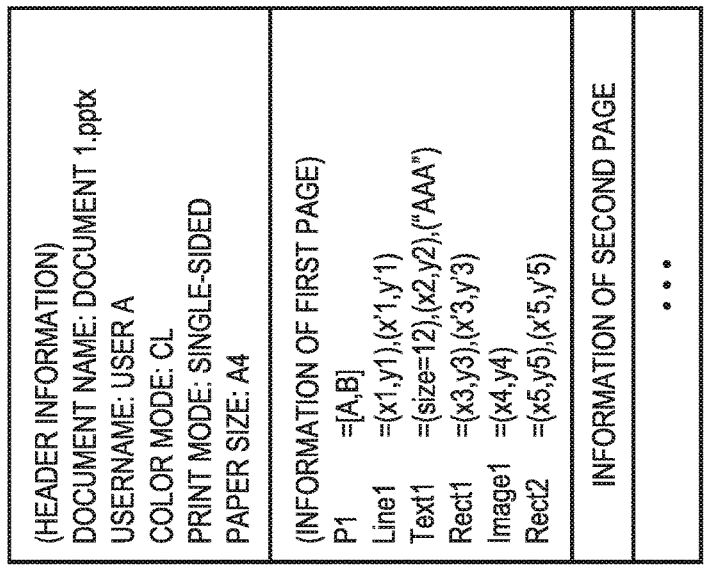
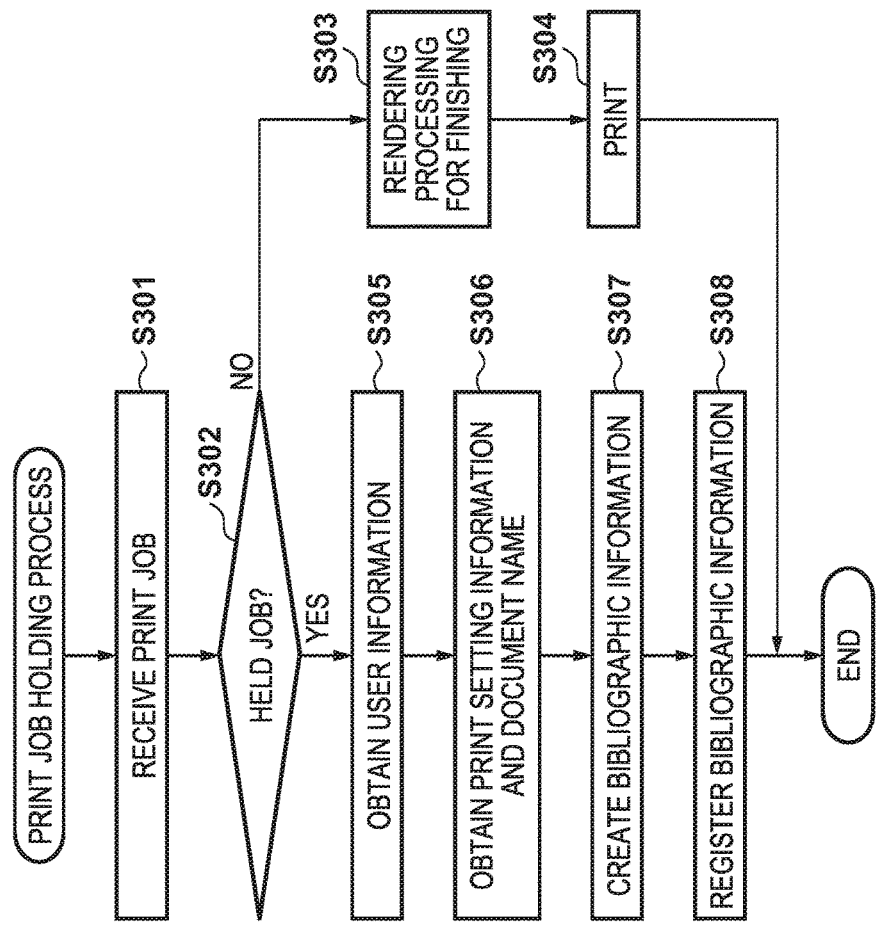

FIG. 3C

< USER A: BIBLIOGRAPHIC INFORMATION >

| JOB ID | FILE INFORMATION | PRINT SETTING INFORMATION | NUMBER OF PAGES | PRECEDING PROCESSING INFORMATION |
|---|---|---|---|---|
| 1 | FILENAME: DOCUMENT 1.pptx SAVE LOCATION: 101 | COLOR MODE: CL PRINT MODE: SINGLE-SIDED PAPER SIZE: A4 ... | 10 | PRECEDING PROCESSING: COMPLETE PRECEDING PROCESSING RESULT: /xxx/yyy/1/image1 /xxx/yyy/1/image2 |
| 2 | FILENAME: DOCUMENT 2.xlsx SAVE LOCATION: 101 | COLOR MODE: BW PRINT MODE: DOUBLE-SIDED PAPER SIZE: A4 ... | 8 | PRECEDING PROCESSING: INCOMPLETE PRECEDING PROCESSING RESULT: — |

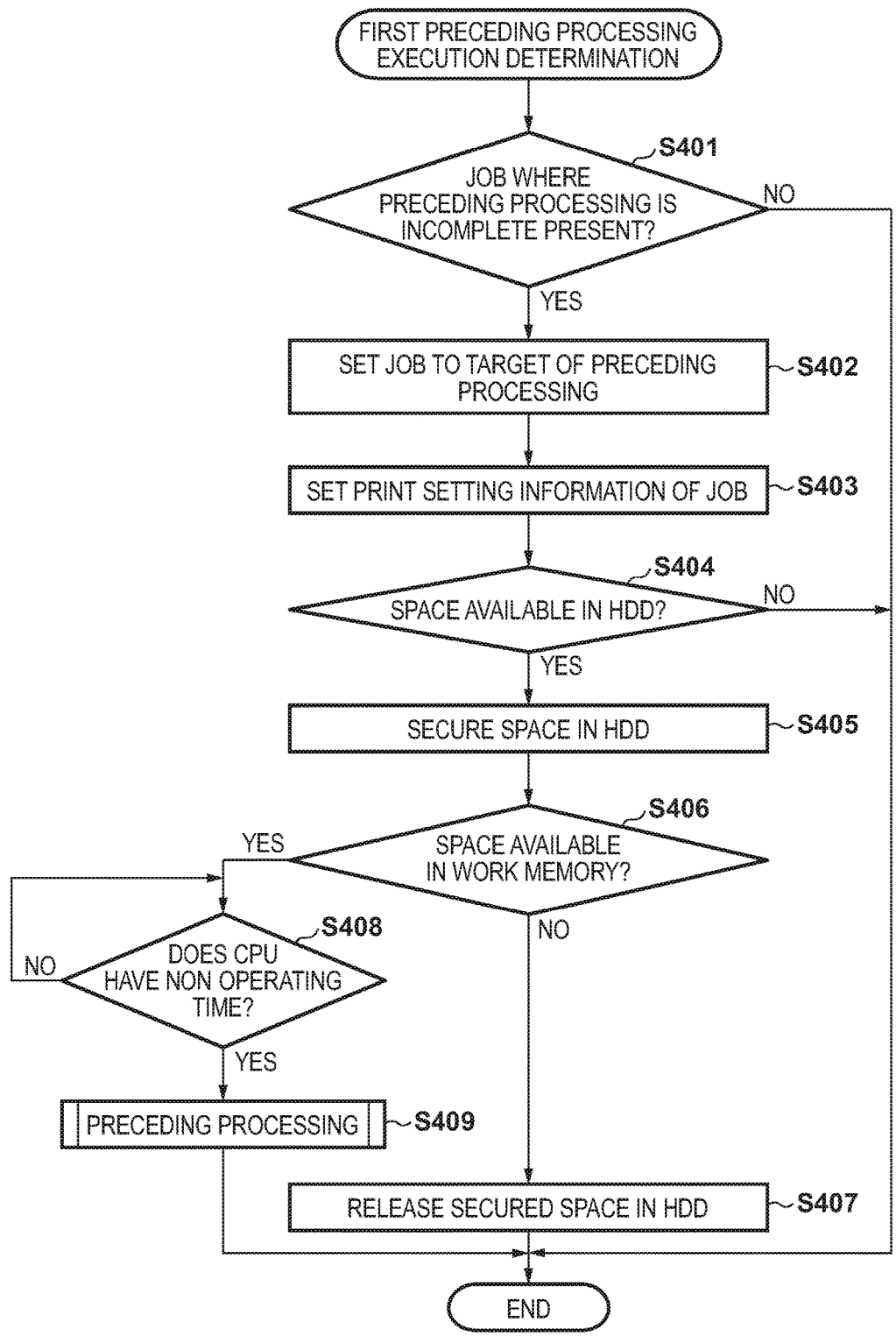

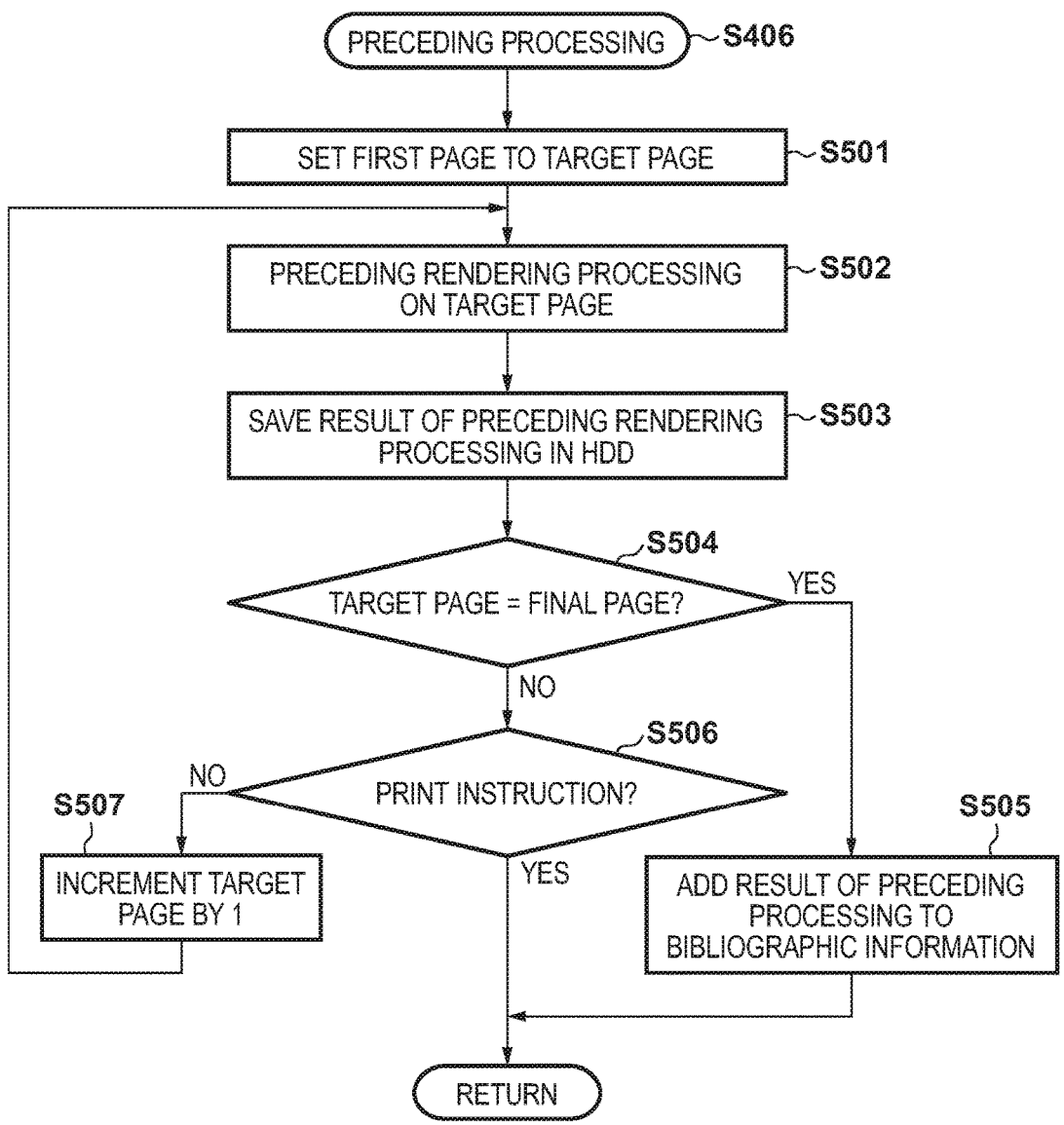

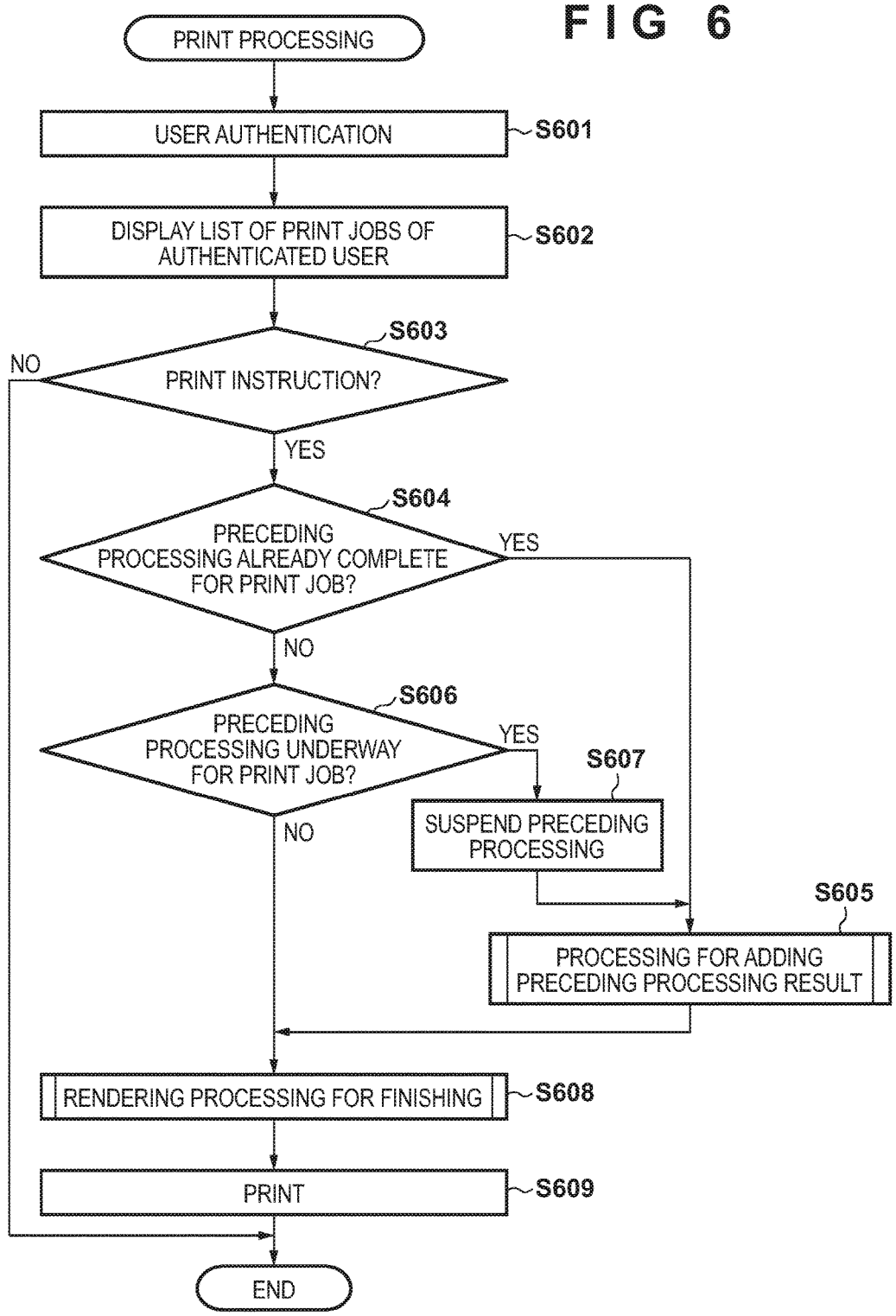

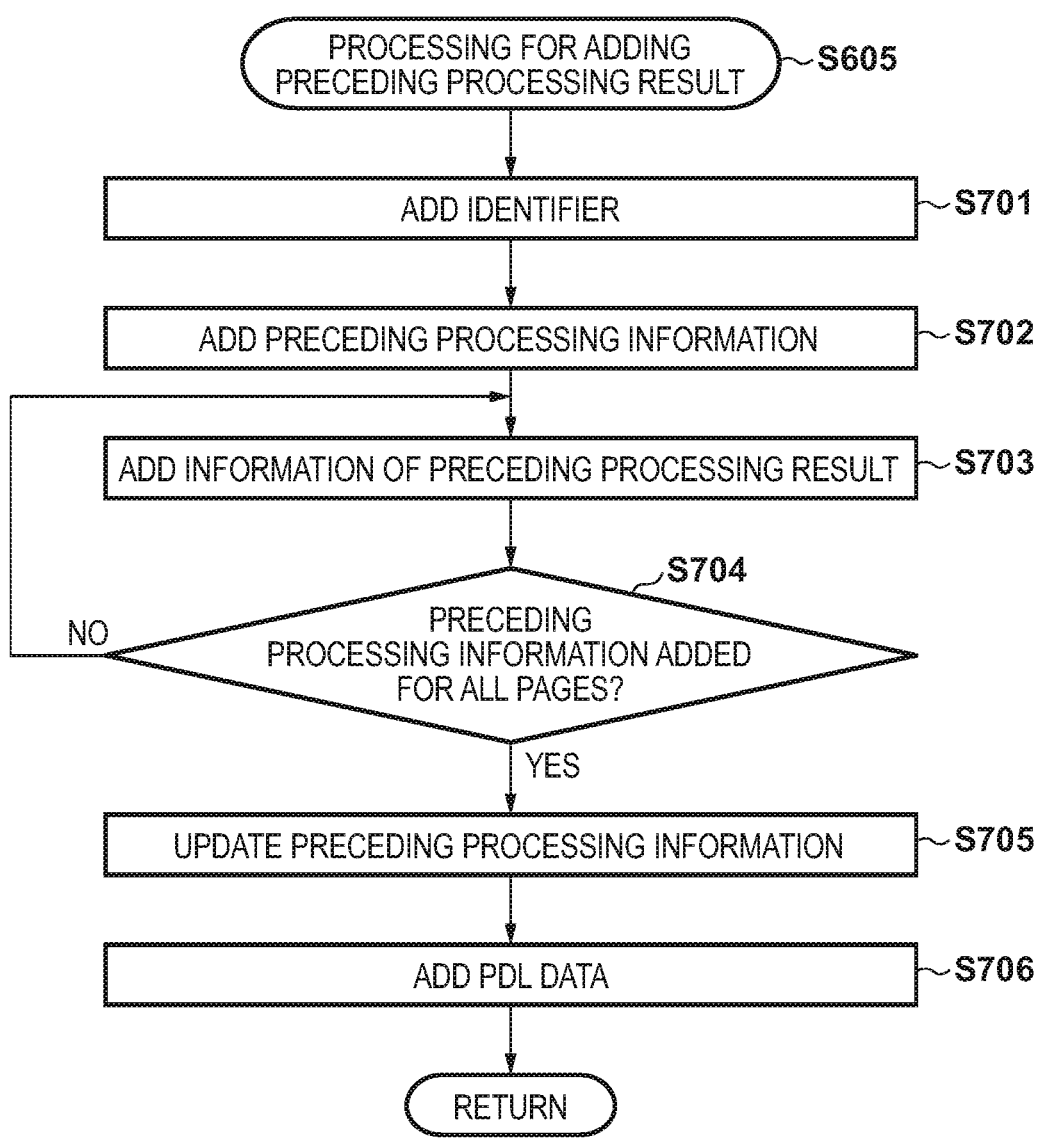

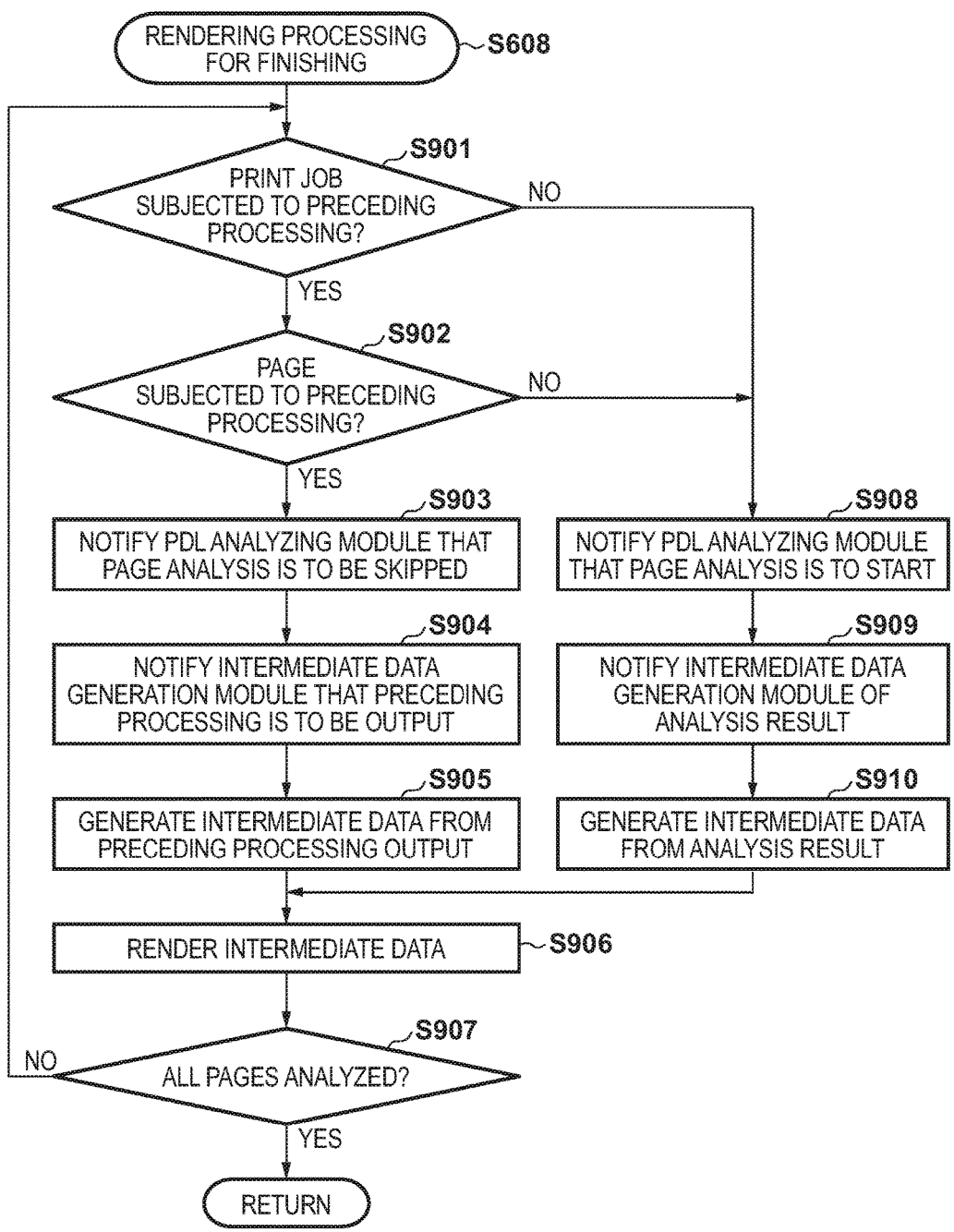

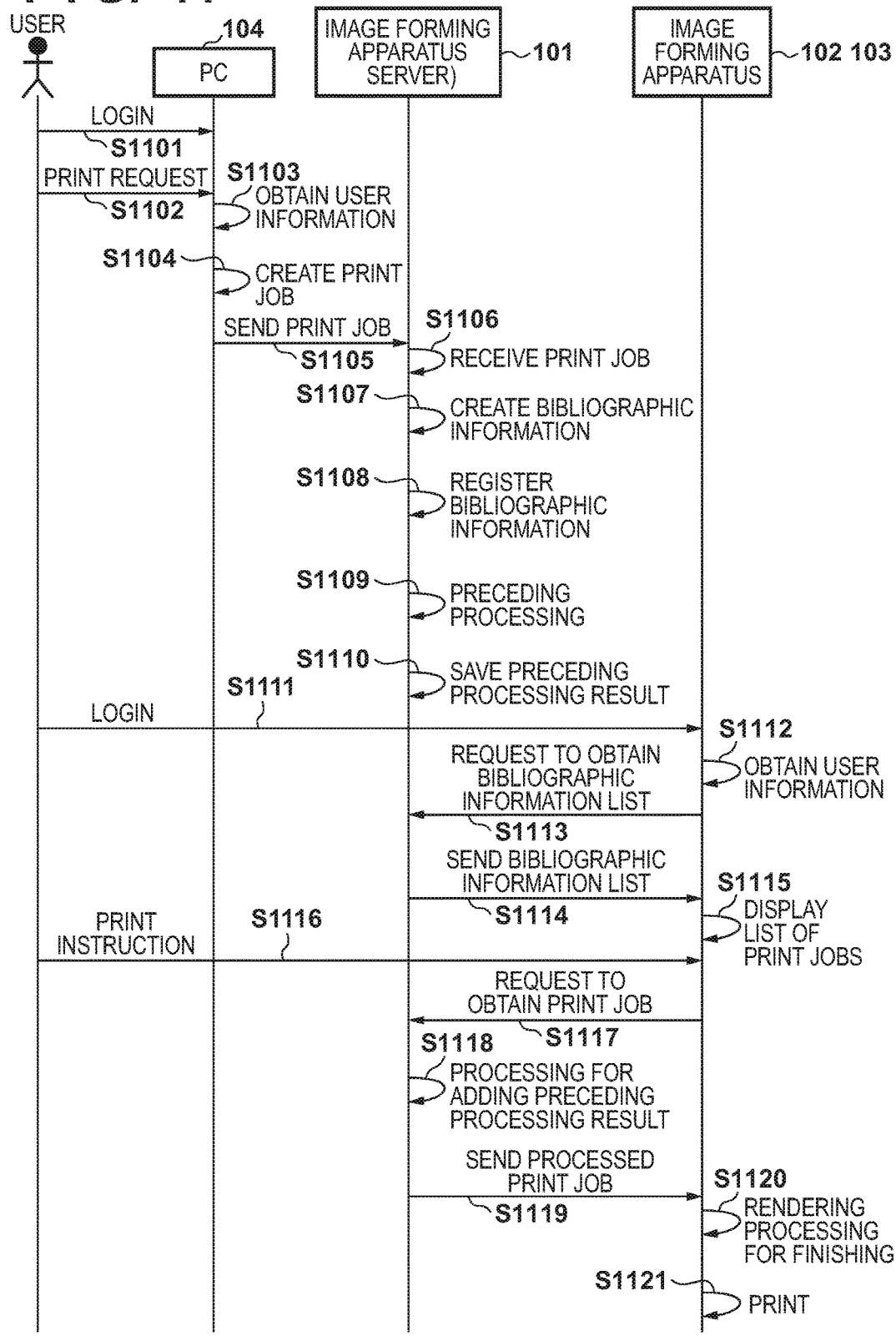

FIG. 17

| HOLD PRINTING | | | |
|---|---|---|---|
| DOCUMENT NAME | TIME RECEIVED | NUMBER OF PAGES | |
| DOCUMENT 1 pptx | 18:05 | 10 | |
| DOCUMENT 2 xlsx | 18:15 | 5 | |

LOGIN/USER A
LOGOUT ~1704
PRINT SETTINGS ~1703
START PRINT ~1702

FIG 19A

< SUB PRINT SETTING INFORMATION >

| SETTING ITEM | VALUE |
|---|---|
| LAYOUT | 2in1 |

FIG 19B

< USER A: PRINT SETTINGS CHANGE INFORMATION >

| SETTINGS ITEM | VALUE | NUMBER OF CHANGES | APPLY |
|---|---|---|---|
| COLOR MODE | BW | 30 | ○ |
| PRINT MODE | DOUBLE SIDED | 20 | |
| LAYOUT | 2in1 | 10 | |

FIG. 19C

< USER A: BIBLIOGRAPHIC INFORMATION >

| JOB ID | FILE INFORMATION | PRINT SETTING INFORMATION | NUMBER OF PAGES | REFERENCE PRINT SETTINGS 1 | PRECEDING PROCESSING INFORMATION 1 | REFERENCE PRINT SETTINGS 2 | PRECEDING PROCESSING INFORMATION 2 |
|---|---|---|---|---|---|---|---|
| 1 | FILENAME: DOCUMENT 1.pptx SAVE LOCATION: 101 | COLOR MODE: CL PRINT MODE: SINGLE-SIDED PAPER SIZE: A4 LAYOUT: 1 IN 1 | 10 | COLOR MODE: CL PRINT MODE: SINGLE-SIDED PAPER SIZE: A4 LAYOUT: 1 IN 1 ... | PRECEDING PROCESSING: COMPLETE PRECEDING PROCESSING RESULT: /xxx/yyy/1/image1 | COLOR MODE: RW PRINT MODE: SINGLE-SIDED PAPER SIZE: A4 LAYOUT: 1 IN 1 ... | PRECEDING PROCESSING: COMPLETE PRECEDING PROCESSING RESULT: /xxx/yyy/2/image1 |
| 2 | FILENAME: DOCUMENT 2.xlsx SAVE LOCATION: 101 | COLOR MODE: BW PRINT MODE: DOUBLE-SIDED PAPER SIZE: A4 LAYOUT: 1 IN 1 ... | 8 | – | PRECEDING PROCESSING: INCOMPLETE PRECEDING PROCESSING RESULT: – | – | PRECEDING PROCESSING: INCOMPLETE PRECEDING PROCESSING RESULT: – |

FIG. 19D

< PRINT FUNCTION RESTRICTIONS >

| PRINT FUNCTION RESTRICTIONS | ON |
|---|---|
| OVERWRITE SETTINGS | PRINT MODE: DOUBLE-SIDED |

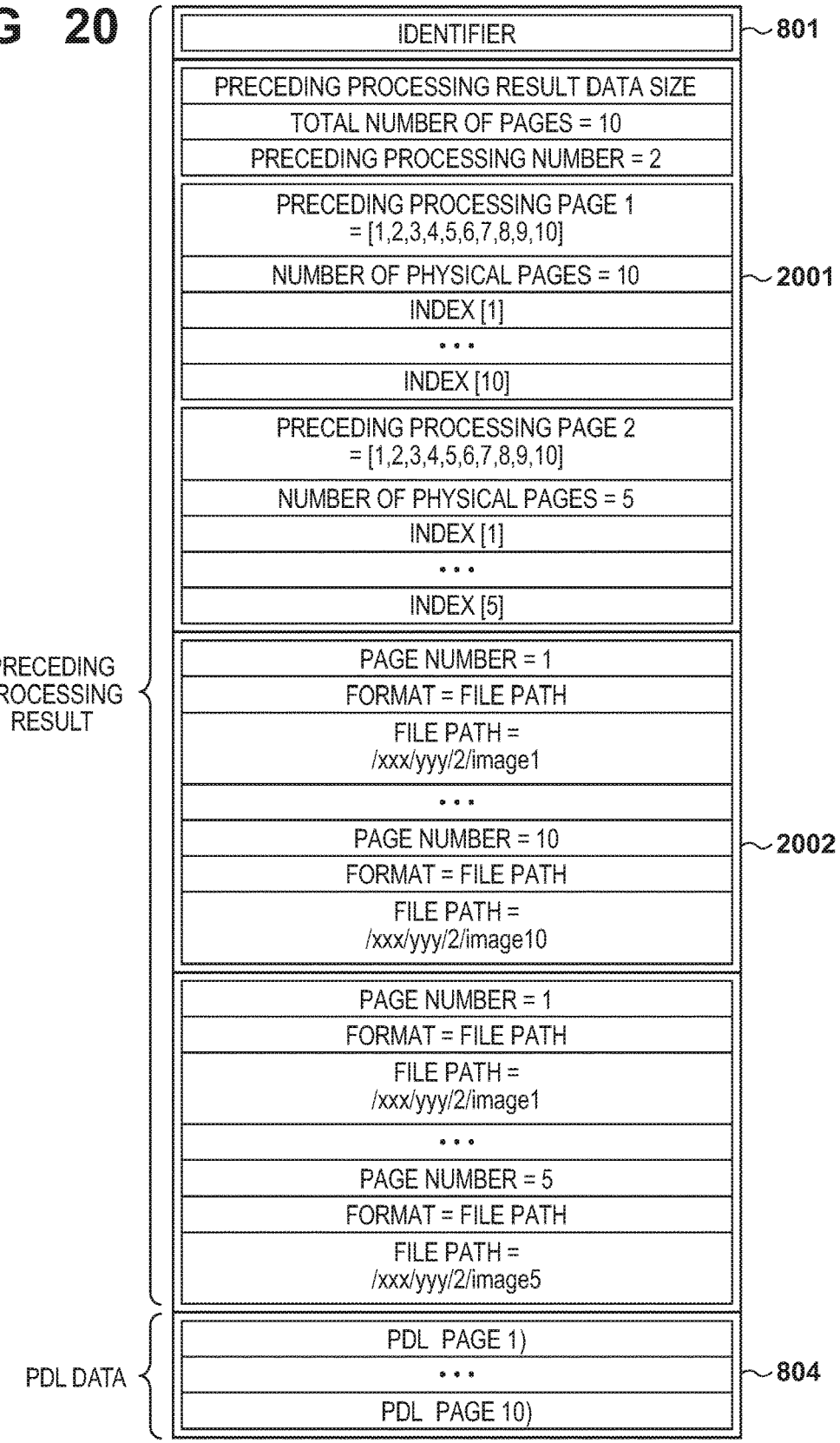

PRINT SYSTEM, PRINTING APPARATUS, METHOD OF CONTROLLING THE PRINTING APPARATUS, AND STORAGE MEDIUM THAT GENERATE PRINT DATA TO BE PRINTED USING RENDERED PRINT DATA

This application claims the benefit of Japanese Patent Application No. 2017-148202, filed Jul. 31, 2017, which is hereby incorporated by reference herein in its entirety.

BACKGROUND OF THE INVENTION

Field of the Invention

The present invention relates to a print system, a printing apparatus, a method of controlling the printing apparatus, and a storage medium.

Description of the Related Art

"Hold printing" has been used for some time, both as a way to prevent situations in which a printed material, printed and discharged from a printing apparatus, or the like, is left alone, and information on the printed material is leaked as a result, and as a way to repeatedly print the same printed material. In hold printing, the printing apparatus does not print a received print job immediately, but rather holds (saves) the print job in the printing apparatus, as disclosed in Japanese Patent Laid-Open No. 2005-242735, for example. Printing is then executed on the basis of the print job saved in the printing apparatus upon a print instruction being made by a user, or the like, who owns the print data, and the user obtains his or her desired printed material.

When printing on the basis of a received print job, print data included in the received print job is typically rendered as a bitmap to obtain image data. The printing is then carried out on the basis of the image data. An amount of the image data is, however, considerably greater than an amount of the print data, and thus, in hold printing, the print data is saved in its original state, as print data. Thus, in the past, the rendering process for rendering the print data into image data has been started upon an instruction to print the held print job being made. It has, therefore, taken a long time to obtain the printed material. Particularly in a printing apparatus that allows the print settings of a held print job to be changed, the print settings to be used in printing of the held print job are not finalized until the instruction to print is made. This means that the rendering process for rendering the print data into image data can, by necessity, only be started once the print instruction has been input. There is thus a problem in that it has taken a long time for the user to obtain the printed material after inputting the print instruction.

SUMMARY OF THE INVENTION

An aspect of the present invention is to eliminate the above-mentioned problem with conventional technology.

A feature of the present invention is to provide a technique for reducing the time taken for a user to obtain a printed material after inputting a print instruction in hold printing.

According to one aspect, the present invention provides a printing apparatus comprising a holding unit that holds a received print job, a memory that stores a set of instructions, and at least one processor that executes the instructions in the memory to carry out preceding processing of rendering the print job held in the holding unit in advance, to store information of the print job subjected to the preceding processing in association with original data of the print job in a storage, and to render the print job using the information of the print job subjected to the preceding processing if the information is stored in the storage, and to render the print job and print the print job if the information of the print job subjected to the preceding processing is not stored the storage, in response to a print instruction for the print job held in the holding unit.

According to another aspect, the present invention provides a print system comprising a server that receives a print job and holds the print job in a holding unit, and a printing apparatus that receives the print job from the server and prints the print job, wherein the server comprises a first memory that stores a set of instructions, and a first processor that executes the instructions in the first memory to carry out preceding processing of rendering the print job held in the holding unit in advance, to store information of the print job subjected to the preceding processing in association with original data of the print job in a storage, to send a list of print jobs stored in the holding unit to the printing apparatus in response to a request from the printing apparatus, and, upon receiving, from the printing apparatus, a print instruction for a print job selected from the list of print jobs, to process data of the print job designated in the print instruction on the basis of the information of the print job subjected to the preceding processing stored in the storage, and to send the processed data to the printing apparatus, and wherein the printing apparatus comprises a second memory that stores a set of instructions, and a second processor that executes the instructions in the second memory to authenticate a user, to display the list of print job sent from the server, to send, to the server, the print instruction for a print job selected by the authenticated user from the displayed list of print jobs, and to carry out printing based on the print job, on the basis of the processed data sent from the server.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a sequence chart for describing an example of a print processing sequence carried out in the print system according to the first embodiment.

FIG. 3A is a flowchart for describing print job holding processing carried out by an image forming apparatus according to the first embodiment.

FIG. 3B is a diagram illustrating an example of the data structure of a print job received by the image forming apparatus.

FIG. 3C is a diagram illustrating an example of bibliographic information registered in a hard disk drive (HDD) of the image forming apparatus.

FIG. 4 is a flowchart for describing processing for determining whether or not to carry out preceding processing (first preceding processing) on a print job not yet subjected to preceding processing by the image forming apparatus, according to the first embodiment.

FIG. 5 is a flowchart for describing preceding processing in step S409 of FIG. 4, carried out by the image forming apparatus according to the first embodiment.

FIG. 6 is a flowchart for describing processing carried out when a print job selected by a logged-in user is executed by the image forming apparatus according to the first embodiment.

FIG. 7 is a flowchart for describing processing for adding a result of preceding processing in step S605 of FIG. 6, carried out by the image forming apparatus 101 according to the first embodiment.

FIG. 9 is a flowchart for describing rendering processing for finishing carried out in step S608 of FIG. 6, carried out by the image forming apparatus according to the first embodiment.

FIG. 11 is a sequence chart for describing an example of a print processing sequence carried out in a print system according to a second embodiment.

FIG. 17 depicts a view illustrating an example of a user interface (UI) screen displayed in an operation panel of the image forming apparatus after user authentication.

FIGS. 19A to 19D are diagrams for describing examples of sub-print setting information, print setting change information of a user A, bibliographic information of the user A, and print function limitations, respectively, according to the third embodiment.

FIG. 20 is a diagram for describing an example of a print job to which information indicating preceding processing results has been added, in the image forming apparatus according to the third embodiment.

DESCRIPTION OF THE EMBODIMENTS

Embodiments of the present invention will be described hereafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1A:
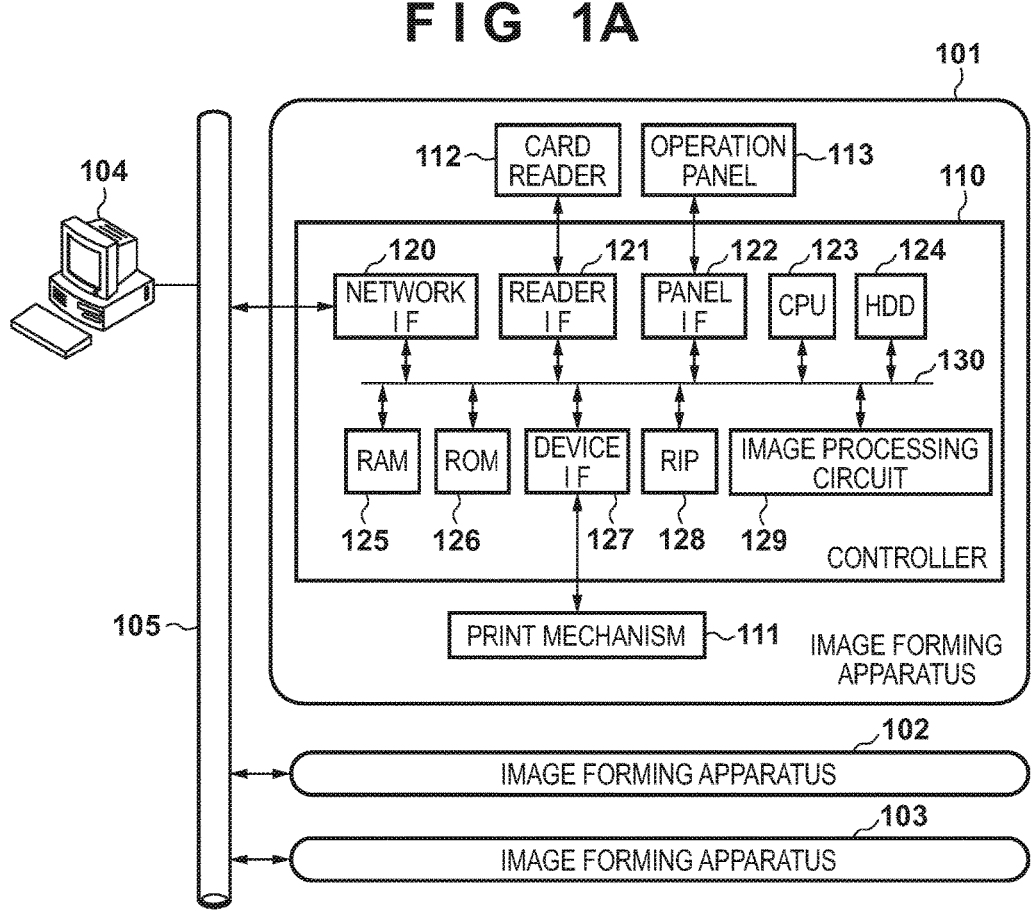
FIG. 1A is a diagram illustrating an example of the configuration of a print system including image forming apparatuses according to a first embodiment of the present invention.

FIG. 1A is a diagram for describing an example of the configuration of a print system including image forming apparatuses according to a first embodiment of the present invention.

Image forming apparatuses 101 to 103 may be any one of a multi-function peripheral (MFP), a single-function printer (SFP), or a laser beam printer (LBP). The image forming apparatuses 101 to 103 may be printing apparatuses using printing methods aside from MFP, SFP, or LBP. Although FIG. 1A illustrates an example in which there are three image forming apparatuses, there may be any number of apparatuses greater than or equal to one. The image forming apparatuses 101 to 103 are connected by a local area network (LAN) 105 to a host computer (a personal computer (PC)) 104 that makes various types of instructions. The image forming apparatuses 101 to 103 execute processing in response to printing instructions from the host computer 104. If a plurality of image forming apparatuses are connected by the LAN 105 as illustrated in FIG. 1A, a given image forming apparatus can receive a print job from another image forming apparatus and execute the printing. This configuration will be described in a second embodiment.

The image forming apparatus 101 includes a controller 110, a print mechanism 111, a card reader 112, and an operation panel 113. The image forming apparatuses 102 and 103 have the same configuration as the image forming apparatus 101, and will, therefore, not be described.

The controller 110 includes a network interface (I/F) 120, a reader I/F 121, a panel I/F 122, a central processing unit (CPU) 123, a hard disk drive (HDD) 124, a random access memory (RAM) 125, a read only member (ROM) 126, and a device I/F 127. The controller 110 further includes a raster image processor (RIP) 128 and an image processing circuit 129, and these are connected to a system bus 130. The CPU 123 controls the image forming apparatus 101 by deploying programs, which are stored in the HDD 124, into the RAM 125 using a boot program stored in the ROM 126, and executing the programs deployed in the RAM 125. The network I/F 120 is realized by a LAN card, or the like, for example, and facilitates the input/output of information with an external device by connecting to the LAN 105. The reader I/F 121 is a unit for interfacing with the card reader 112, which receives authentication information from the exterior. The reader I/F 121 receives the authentication information input from the exterior and communicates the information to the CPU 123. The panel I/F 122 is a unit for interfacing with the operation panel 113, which has a display screen capable of displaying various menus, print job information, and the like. The panel I/F 122 outputs operation screen data to the operation panel 113. The panel I/F 122 communicates information input by an operator through the operation panel 113 to the CPU 123. The CPU 123 is a central processing unit for controlling the image forming apparatus 101 as a whole. The HDD 124 is a storage device, such as a hard disk drive, and stores system software for various processes, print jobs, and image data that have been input, and so on. The RAM 125 provides a work memory for the CPU 123 to operate, and is also used as an image memory for temporarily storing print jobs, image data, and so on that have been input. The ROM 126 is a boot ROM, and stores a system boot program, other various types of data, and so on. The device I/F 127 connects the print mechanism 111 to the controller 110, and carries out synchronous/asynchronous conversion of image data. The RIP 128 analyzes drawing commands (page description language (PDL) commands) included in print jobs, intermediate data (display lists), and so on, and renders these into image data. The image processing circuit 129 analyzes print jobs and carries out processing, such as correction, resolution conversion, and so on, on generated image data in accordance with the print mechanism 111.

The print mechanism 111 executes printing in accordance with instructions from the controller 110. The card reader 112 has a function for enabling the reading of information in an identification (ID) card, or the like held, by a user, and communicates user information read from the ID card to the controller 110. The operation panel 113 has a touch panel function, receives operation screen data from the controller 110, and displays screens based on the received data, receives operation instructions from the user, and communicates the instructions to the controller 110, and so on.

Figure 1B:
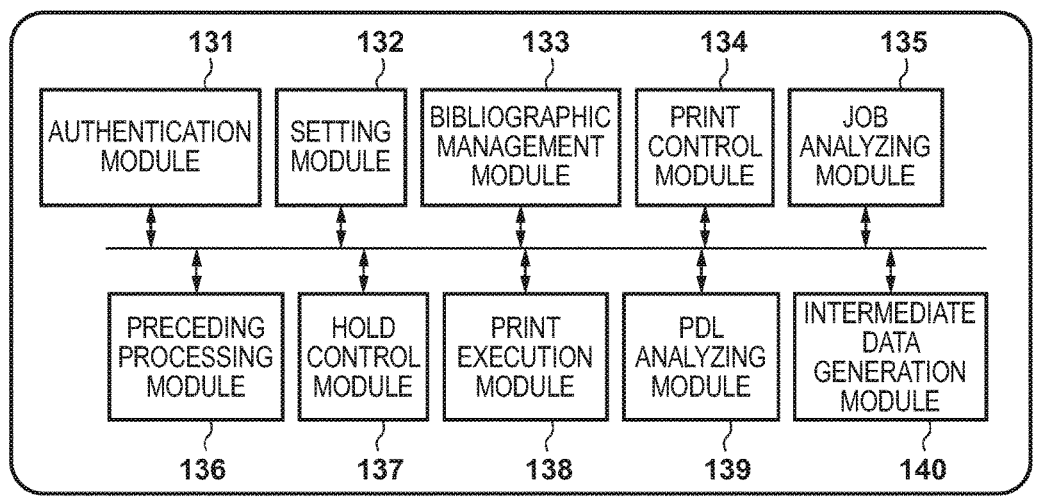
FIG. 1B is a functional block diagram for describing the software configuration of a controller.

FIG. 1B is a functional block diagram for describing the software configuration of the controller 110.

The controller 110 includes an authentication module 131, a setting module 132, a bibliographic management module 133, a print control module 134, a job analyzing module 135, a preceding processing module 136, a hold control module 137, a print execution module 138, a PDL analyzing module 139, and an intermediate data generation module 140. The functions of these modules are realized by the CPU 123 executing programs deployed in the RAM 125 from the HDD 124.

The authentication module 131 receives the authentication information from the reader I/F 121 through the system bus 130, and communicates that information to the hold control module 137. The setting module 132 controls input/output to the operation panel 113 from the panel I/F 122 through the system bus 130. The bibliographic management module 133 controls a print job received by the hold control module 137, information pertaining to the print job, and the like. The print control module 134 obtains print instructions, print job information, and the like, input through the network I/F 120, and instructs the hold control module 137, the print execution module 138, and the like, to process the print job. The job analyzing module 135 analyzes the print job received by the hold control module 137. The preceding processing module 136 carries out rendering processing on the print job in accordance with a result of the job analyzing module 135 analyzing the print job received by the hold control module 137. The hold control module 137 controls the print job analysis, management, and preceding processing for the print job received from the print control module 134, makes print instructions to the print execution module 138, and so on. The print execution module 138 generates image data for the print job received from the print control module 134, the hold control module 137, or the like, by controlling the PDL analyzing module 139, the intermediate data generation module 140, the RIP 128, and the image processing circuit 129. Furthermore, the print execution module 138 outputs the generated image data to the print mechanism 111 through the device I/F 127 to execute print processing. The PDL analyzing module 139 carries out PDL analysis for the print job instructed by the print execution module 138. The intermediate data generation module 140 generates intermediate data on the basis of the information analyzed by the PDL analyzing module 139.

FIG. 2 is a sequence chart for describing an example of a print processing sequence carried out in the print system according to the first embodiment. In this example, the image forming apparatus 101 receives a print job from the PC 104 and saves the print job, after which a user logs into the image forming apparatus 101 and prints the print job. Note that the processing executed by the image forming apparatus 101 in FIG. 2 is realized by the CPU 123 of the image forming apparatus 101 deploying programs, stored in the HDD 124, into the RAM 125, and executing those programs. Additionally, the processing executed by the PC 104 in FIG. 2 is realized by a CPU (not shown) of the PC 104 deploying programs, stored in an HDD, or the like, into RAM as necessary, and executing those programs.

First, in step S201, the user logs into the PC 104, runs a desired application on the PC 104, and requests data to be printed in step S202. Accordingly, the PC 104 obtains the user information of that user in step S203. Then, in step S204, the PC 104 generates a print job to which the obtained user information has been added, and, in step S205, the PC 104 sends the print job to the image forming apparatus 101.

As a result, in step S206, the image forming apparatus 101 receives the print job and saves the print job in the HDD 124. Then, in step S207, the image forming apparatus 101 extracts the user information added to the print job, creates bibliographic information, and saves the bibliographic information in the HDD 124 in step S208. Upon successfully saving the bibliographic information, the image forming apparatus 101 starts preceding processing in step S209. Then, in step S210, the image forming apparatus 101 sequentially saves the results of the preceding processing in the HDD 124.

Next, once the user has logged into the image forming apparatus 101 in step S211, the image forming apparatus 101 obtains the user information of that user in step S212. Then, in step S213, a list of that user's print jobs, which are held in the HDD 124, is displayed in the operation panel 113 on the basis of that user's bibliographic information.

Then, in step S214, when the user selects a desired print job from the displayed list and makes a print instruction, the image forming apparatus 101 adds the result of the preceding processing, saved in step S210, to the selected print job. The processing for adding the result of the preceding processing to the print job will be described in detail later. Then, in step S216, the image forming apparatus 101 carries out rendering processing for finishing, using the preceding processing results of the print job to which the preceding processing results have been added, and then prints the print job on the basis of the rendering result in step S217.

FIG. 3A is a flowchart for describing the print job holding processing carried out by the image forming apparatus 101 according to the first embodiment. FIG. 3B is a diagram illustrating an example of the data structure of the print job received by the image forming apparatus 101. FIG. 3C is a diagram illustrating an example of the bibliographic information registered in the HDD 124 of the image forming apparatus 101. Note that the processing illustrated in the flowchart in FIG. 3A is realized by the CPU 123 of the image forming apparatus 101 executing programs deployed in the RAM 125 from the HDD 124.

First, in step S301, the CPU 123 of the image forming apparatus 101 receives a print job sent from the PC 104, or the like, through the network I/F 120. This print job has a data structure, such as that illustrated in FIG. 3B, for example. Header information, including various types of setting information, is located at the beginning of the data, and is followed by data for each page (PDL data). "P1", "Line1", "Text1", and the like, in the information of each page are examples of drawing commands for constructing the page.

The processing then advances to step S302, in which the CPU 123 determines whether the print job received in step S301 is a "held job" or is a "job to be printed directly". The method for determining whether or not the print job is a "held job" is determining whether a parameter stored in the image forming apparatus 101 instructs the print job to be held, analyzing information embedded in the header of the print job, or the like, but the method will not be described here. If the CPU 123 has determined in step S302 that the print job is a "job to be printed directly", the processing advances to step S303. In step S303, the CPU 123 starts processing the print job. The CPU 123 analyzes the print job, generates intermediate data, and so on, and generates image data by causing the RIP 128 to carry out rendering processing on the generated intermediate data. Then, in step S304, the CPU 123 carries out image correction on the generated image data using the image processing circuit 129, outputs the result to the print mechanism 111 through the device I/F 127, and executes the print job, after which the processing ends.

On the other hand, if the print job is determined to be a "held print job" in step S302, the processing moves to step S305. In step S305, the CPU 123 obtains the user information contained in the print job. In the example illustrated in FIG. 3B, the user information is "username: user A". The configuration may, however, be such that if the user information is not contained in the header information of the print job, the user information is sent separately from the source PC 104. The user information may be any identification information capable of identifying the user that instructed the print, such as a username, a user ID, or the like.

Next, the processing advances to step S306, in which the CPU 123 obtains print setting information and a document name included in the received print job. The print setting information includes, for example, information indicating whether the print job is a single-sided print or a double-sided print, information indicating whether the print is a color print or a black-and-white print, information pertaining to the paper size, and so on. FIG. 3B is an example, however, and the print data may omit some of the print setting information. In this case, default settings values registered in the HDD 124 or the ROM 126 may be used, or the user may make the settings when executing the printing in the image forming apparatus 102.

The processing then advances to step S307, in which the CPU 123 associates the user information obtained in step S305 with the print setting information and the document name obtained in step S306. The associated information is then added, as a single record, to the bibliographic information corresponding to that user information. FIG. 3C is a diagram illustrating an example of the bibliographic information of "user A". Note that the location in which the file information of the bibliographic information is saved also contains information for identifying the image forming apparatus that is executing that processing (e.g., "save location: 101" in FIG. 3C).

FIG. 3C is a diagram illustrating an example of the bibliographic information for each of users, according to the first embodiment. The bibliographic information of the user A is indicated as an example here. The bibliographic information according to the first embodiment includes a job ID, file information, the print setting information, the number of pages, preceding processing information, and so on, for example. A value unique to the print job is set in the job ID.

The processing then advances to step S308, in which the CPU 123 registers the bibliographic information, to which one record has been added in step S307, to the HDD 124. The received print job is also saved in the HDD 124 as a print job corresponding to the record added this time. Note that at the point in time when the bibliographic information is registered in step S308, the preceding processing is registered as "incomplete" and the preceding processing result is registered as "unset" (corresponding to "preceding processing result: —" in FIG. 3C) as the preceding processing information.

FIG. 4 is a flowchart for describing processing for determining whether or not to carry out preceding processing (first preceding processing) on a print job not yet subjected to preceding processing by the image forming apparatus 101, according to the first embodiment. Note that the processing illustrated in this flowchart is realized by the CPU 123 of the image forming apparatus 101 executing programs deployed in the RAM 125 from the HDD 124. Here, the CPU 123 functions primarily as the print control module 134 of FIG. 1B.

First, in step S401, the CPU 123 reads out bibliographic information, such as that illustrated in FIG. 3C, that is registered in the HDD 124, and determines whether or not there is a print job for which the preceding processing is "incomplete". The processing ends here if there is no print job for which the preceding processing is "incomplete".

On the other hand, if, in step S401, the CPU 123 determines that there is a print job for which the preceding processing is "incomplete", the processing proceeds to step S402, in which that print job is set as a target for preceding processing. The processing then advances to step S403. In step S403, the CPU 123 sets the print setting information in the bibliographic information of that print job (the original print settings of that print job) as the print settings to be used in the preceding processing, after which the processing advances to step S404. In step S404, the CPU 123 confirms the available space in a region of the HDD 124 set aside for storing preceding processing results, and determines whether or not that available region has enough space to store the result if the preceding processing is carried out on all pages of the print job. If it is determined that there is enough space, the processing advances to step S405, but, if it is determined that there is not enough space, the processing ends without executing the preceding processing.

In step S405, the CPU 123 secures an area necessary for storing the preceding processing results in the preceding processing result storage region of the HDD 124, after which the processing advances to step S406. In S406, the CPU 123 determines whether or not enough work memory for executing the preceding processing can be secured in the RAM 125. If it is determined that the work memory cannot be secured, the processing advances to step S407. In step S407, the CPU 123 releases the area of the HDD 124 secured in step S405, and the processing then ends without the preceding processing being executed. On the other hand, if it is determined in step S406 that the work memory can be secured, the processing advances to step S408. In step S408, the CPU 123 determines whether or not the CPU 123 has non-operating time. If there is no non-operating time, the determination of step S408 is repeated after waiting for a set amount of time. If the CPU 123 determines in step S408 that there is non-operating time, the processing advances to step S409, and the preceding processing is executed.

For the sake of simplicity, the foregoing describes determining whether or not the CPU 123 has non-operating time in step S408 at the start of the preceding processing. The operating time of the CPU 123 is generally managed by an execution scheduler of the operating system (OS), which is run by the CPU 123, and the operating time programs running in parallel is switched by the scheduler every set interval. Accordingly, the processes of step S408 and step S409 are executed as appropriate by an operating system (OS) scheduler.

FIG. 5 is a flowchart for describing the preceding processing in step S409 of FIG. 4, carried out by the image forming apparatus 101 according to the first embodiment. Here, the CPU 123 functions primarily as the preceding processing module 136 of FIG. 1B.

First, in step S501, the CPU 123 sets a preceding processing target page of the print job being processed to the first page. The processing then advances to step S502, in which the CPU 123 generates image data by carrying out rendering processing on the page set as the target of the preceding processing in step S501 (preceding rendering processing). The processing then advances to step S503, in which the CPU 123 saves the generated image data in the HDD 124 on a page-by-page basis, for example. Note that at this time, the CPU 123 stores the image data, saved on a page-by-page basis, in association with the bibliographic information, which itself is associated with the print job subject to the corresponding preceding processing, so that the image data can be managed in correspondence with the pages of the print job. The processing then advances to step S504, in which the CPU 123 determines whether or not the preceding processing target page is the final page in the print job. The processing advances to step S506 if it is determined that the target page is not the final page. In step S506, the CPU 123 determines whether or not the user has made a print instruction for the print job on which the rendering processing is being executed. If there is no print instruction, the processing advances to step S507, in which the preceding processing target page is set to the next page. The processing then advances to step S502. On the other hand, if it is determined in step S506 that a print instruction has been input, the preceding processing is suspended, and this processing ends. The print instruction will be described later with reference to FIG. 17.

If, in step S504, the CPU 123 determines that the preceding rendering processing is complete for all of the pages, the processing advances to step S505. In step S505, the CPU 123 adds information saved as a result of the preceding rendering processing carried out in step S503 to the corresponding bibliographic information, after which the processing ends. This is recorded as "preceding processing: 'complete'", which indicates that the preceding processing is complete, as in the preceding processing information of the bibliographic information having a job ID of "1", indicated in FIG. 3C. Furthermore, information indicating where the results of the preceding processing are stored, e.g. "preceding processing result: /xxx/yyy/1/image1" and "/xxx/yyy/1/image2", are added as well.

As described thus far, by executing the processing described in the flowcharts in FIGS. 4 and 5, preceding processing for a held print job is carried out if the image forming apparatus has available processing resources, and the preceding processing information is saved in the form illustrated in FIG. 3C, for example. If a print instruction is input while the preceding processing is being executed, the preceding processing is suspended, and the information of the preceding processing completed by that point is added to the bibliographic information of the print job. Doing so makes it possible to effectively use the results of the preceding processing carried out up until that point, and quickly start the print processing in response to the print instruction.

FIG. 6 is a flowchart for describing processing carried out when a print job selected by a logged-in user is executed by the image forming apparatus 101 according to the first embodiment. Note that the processing illustrated in this flowchart is realized by the CPU 123 of the image forming apparatus 101 executing programs deployed in the RAM 125 from the HDD 124. Here, the CPU 123 functions primarily as the authentication module 131, the setting module 132, the hold control module 137, and the print execution module 138 of FIG. 1B.

First, in step S601, when the user places his/her ID card on or in the card reader 112, the CPU 123 receives the user information read from the ID card by the card reader 112, via the reader I/F 121, and authenticates the user. Although an example in which the user information is read from the user's ID card is described here, a known authentication method, such as inputting the user information and a password from the operation panel 113, or the like, and authenticating the user, may be used instead. The processing advances to step S602 if the user authentication succeeds. In step S602, the CPU 123 obtains, from the HDD 124, the bibliographic information corresponding to the same user information as the user information obtained in step S601, and generates a list of print jobs on the basis of the bibliographic information. Accordingly, this print job list is a list of print jobs loaded by the user who was successfully authenticated (the logged-in user) and held. The print job list is displayed on the operation panel 113 through the panel I/F 122. The information displayed on the operation panel 113 at this time is indicated in FIG. 17, for example.

FIG. 17 depicts a view illustrating an example of a UI screen displayed in the operation panel 113 of the image forming apparatus 101 after user authentication.

A print job list 1701, including document 1 and document 2 as print jobs held by the authenticated user, is displayed in the example of FIG. 17. Here, the user can select a desired print job from the print job list 1701 and then make a print instruction for the selected print job by pressing a print start button 1702. The user can also select a desired print job from the print job list 1701 and then change the print settings of the selected print job by pressing a print settings button 1703. A log out button 1704 is a button for instructing a logged-in user to log out.

The processing then advances to step S603, in which the CPU 123 determines whether or not a print instruction has been made by the user for a print job displayed in the print job list 1701. It is determined that the print instruction has been made if, for example, the user has selected a print job from the print job list 1701 and pressed the print start button 1702. It is determined that the print instruction has not been made if the user presses the log out button 1704, for example, without pressing the print start button 1702. If the CPU 123 determines in step S603 that the print instruction has not been made, the processing ends.

On the other hand, if the CPU 123 has determined in step S603 that the print instruction has been made, the processing proceeds to step S604. In step S604, the CPU 123 determines whether or not the preceding processing is compete for the print job indicated by the print instruction. This determination is made by referring to the bibliographic information of the print job and confirming whether or not the preceding processing information added in step S505 of FIG. 5 is "complete". If the CPU 123 has determined in step S604 that the preceding processing for the print job is complete, the processing advances to step S605. In step S605, the CPU 123 updates the print job by adding information of the preceding processing results to the PDL data. Details of the processing for adding the preceding processing results will be given later with reference to the flowchart in FIG. 7. The process then advances to step S608, in which the CPU 123 executes the rendering processing for finishing in accordance with the print instruction for the print job. Then, in step S609, printing is executed on the basis of the rendering processing result. This processing is the same as the processing of step S304 in FIG. 3A.

If the CPU 123 has determined in step S604 that the preceding processing for the print job is incomplete, the processing advances to step S606. In step S606, the CPU 123 determines whether or not the preceding processing is underway for the print job. This determination may be made by referring to the bibliographic information of the print job and confirming whether or not the preceding processing is underway, in a manner similar to step S604, or by confirming whether or not image data already subjected to the preceding rendering processing associated with the bibliographic information in step S503 of FIG. 5 is present. If the CPU 123 has determined in step S606 that the preceding processing for the print job is underway, the processing advances to step S607. In step S607, the CPU 123 suspends the preceding processing for the print job. The information of the suspended preceding processing is used to determine whether or not a print instruction has been made, as described for step S506 of FIG. 5. The processing then advances to step S605, in which the CPU 123 obtains the preceding processing results saved in the HDD 124 at the point in time when the preceding processing was suspended (the image data associated with the corresponding bibliographic information in step S503 of FIG. 5) as the preceding processing information. The preceding processing information is added to the print job, and the processing advances to step S608.

On the other hand, if the CPU 123 determines in step S606 that the preceding processing for the print job indicated by the print instruction is not underway, the processing advances to step S608, in which the rendering processing for finishing is carried out in accordance with the print instruction for the print job. The rendering processing for finishing is the same processing as that of step S303 in FIG. 3A if no information indicating preceding processing results is added to the print job. The rendering processing for finishing if information indicating the preceding processing results has been added to the print job will be described in detail later with reference to the flowchart in FIG. 9.

FIG. 7 is a flowchart for describing processing for adding the preceding processing results in step S605 of FIG. 6, carried out by the image forming apparatus 101 according to the first embodiment.

Figure 8:
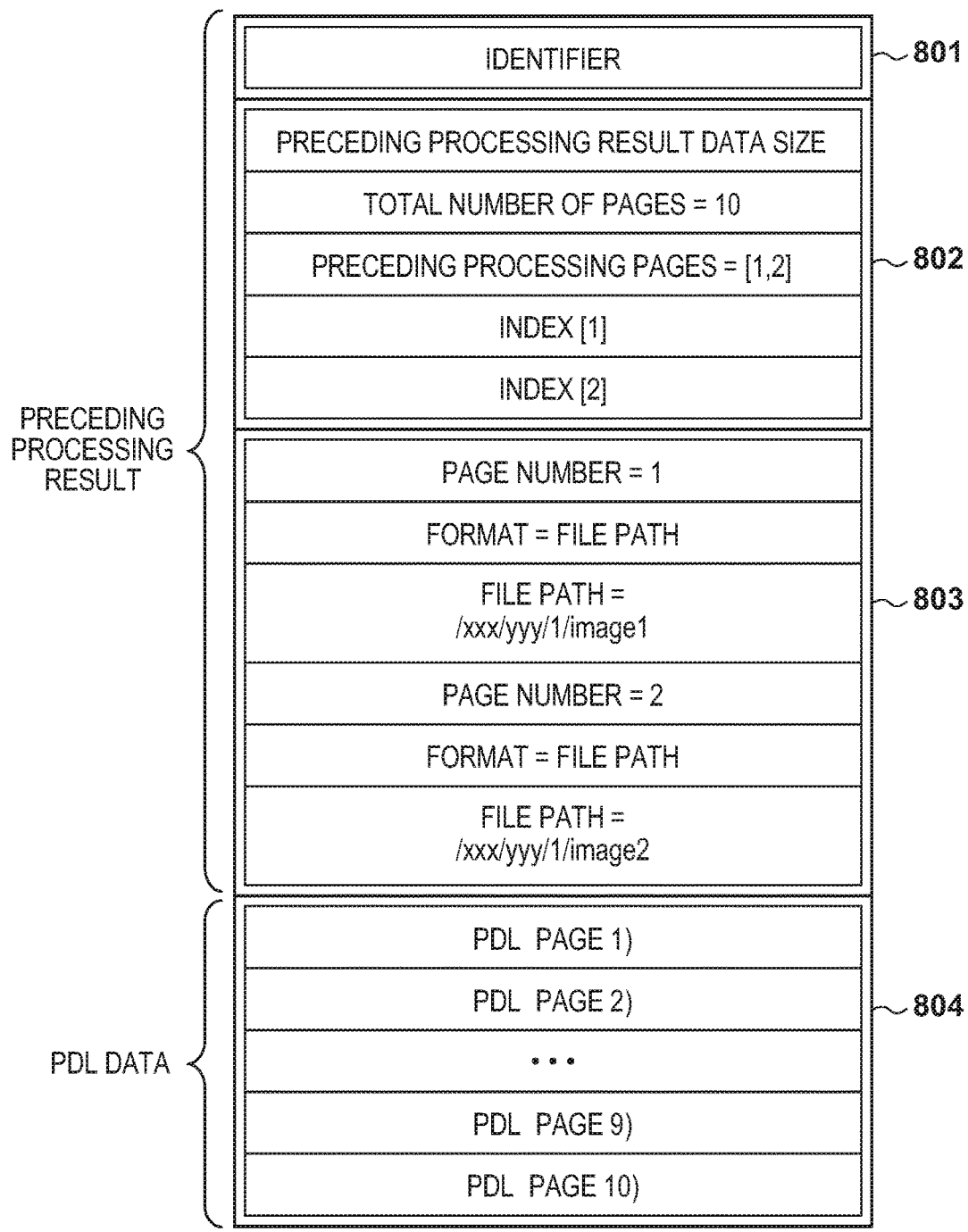
FIG. 8 is a diagram illustrating an example of a print job to which information indicating preceding processing results has been added, in the image forming apparatus according to the first embodiment.

FIG. 8 is a diagram illustrating an example of a print job to which information indicating the preceding processing results has been added, in the image forming apparatus 101 according to the first embodiment. FIG. 8 illustrates an example in which the preceding processing is complete for the first and second pages of a 10-page document included in the print job. The storage locations of the image data for the first and second pages, for which the preceding processing is complete, and original PDL data 804 for the first to tenth pages, can be obtained by referring to the information of this print job.

First, in step S701, the CPU 123 starts processing for adding the preceding processing results to the PDL data, and adds identifier information 801 (FIG. 8) to the print job. The identifier information 801 indicates information to which the preceding processing results have been added, and may be any information identifiable by the CPU 123, including a character string or numerical value. The process then advances to step S702, in which the CPU 123 adds preceding processing information 802 (FIG. 8) after the identifier information added in step S701. The preceding processing information 802 includes the overall data size of the preceding processing results, the total number of pages of the target print job, information of the page undergoing preceding processing, and so on. Regarding information that cannot be known until processing that will be described later has been carried out, such as the overall data size of the preceding processing results and index information pointing to information of the preceding processing result, only an area for storing that information is secured, and the information is then updated after the processing, which will be described later, has been carried out. The structure of the preceding processing information 802 in FIG. 8 is merely an example, and any structure may be used as long as the information necessary for analyzing the preceding processing result information is provided.

The process then advances to step S703, in which the CPU 123 adds preceding processing result information 803 (FIG. 8) after the preceding processing information added in step S702. Here, information of the page number of the preceding processing results, the format, and information of the preceding processing results is added as a single set. In the preceding processing result information 803 of FIG. 8, the information of a set for the first page is added first, and the format of the preceding processing result is set to "file path". Note that when the format is set to "file path", the CPU 123 adds information of the file path in the HDD 124 in which the preceding processing results are stored (information identifying the storage location of the preceding processing result) as the preceding processing result information.

The processing then advances to step S704, in which the CPU 123 determines whether or not the information of all pages for which the preceding processing is complete has been added. If it is determined that the information of all pages for which the preceding processing is complete has not been added, the processing returns to step S703, and the next page is processed. If the CPU 123 determines in step S704 that the information of all pages for which the preceding processing is complete has been added, the processing advances to step S705. In step S705, the CPU 123 updates the preceding processing information. Here, the overall data size of the preceding processing results, the index information pointing to the information of the preceding processing results, and the like, are overwritten and updated, in the area secured in advance, as post-processing information. The processing then advances to step S706, in which the CPU 123 adds the PDL data 804 (FIG. 8) after the preceding processing results (801, 802, and 803) created in steps S701 to step S705. Here, the PDL data 804 is added in its original state, without being processed. Through this processing, a print job combining the preceding processing results of the first and second pages with the ten pages of PDL data is generated, as illustrated in FIG. 8, for example.

By executing the processing of FIG. 7, a print job to which information of the preceding processing results is added can be created, such as that illustrated in FIG. 8, can be created.

Rendering processing for finishing (step S608 in FIG. 6), which creates the image data used in printing, will be described next with reference to FIGS. 9 to 10C.

FIG. 9 is a flowchart for describing rendering processing for finishing carried out in step S608 of FIG. 6, carried out by the image forming apparatus 101 according to the first embodiment.

Figure 10B:
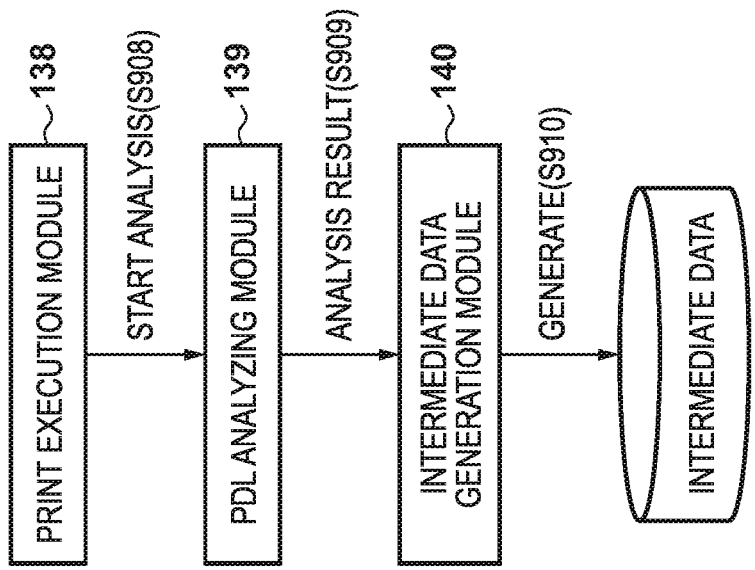
FIGS. 10A to 10C are diagrams illustrating processing, indicated in FIG. 9, carried out by a print execution module, a page description language (PDL) analyzing module, and an intermediate data generation module of the image forming apparatus according to the first embodiment.
Figure 10A:
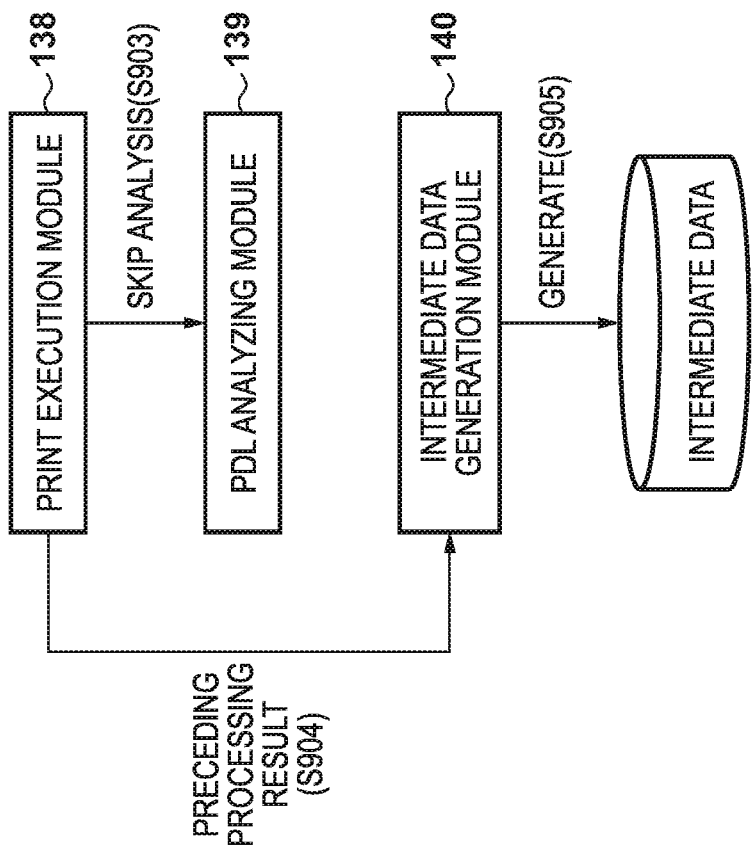
Figure 10C:
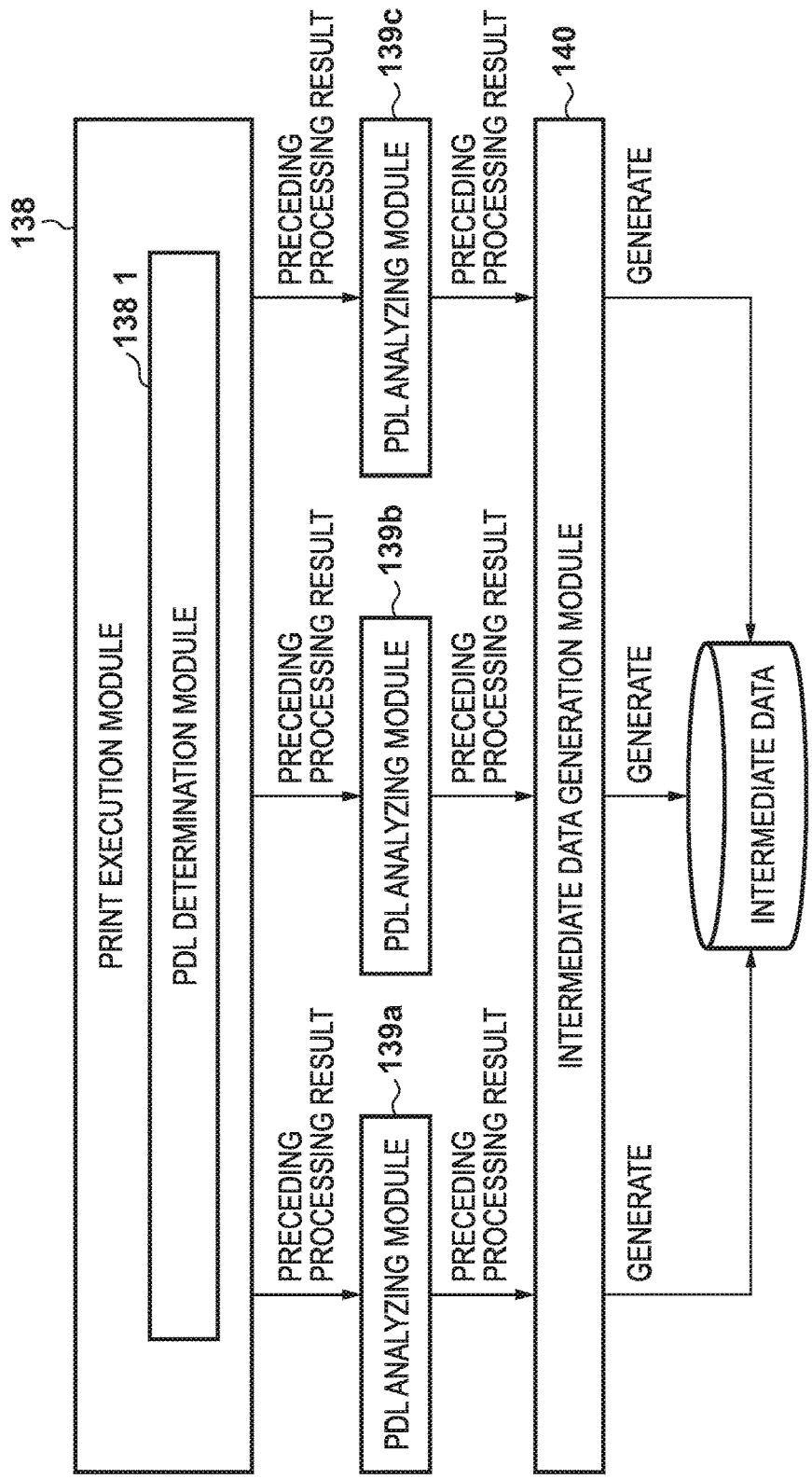

FIGS. 10A to 10C are diagrams for describing processing, indicated in FIG. 9, carried out by the print execution module 138, the PDL analyzing module 139, and the intermediate data generation module 140 of the image forming apparatus 101 according to the first embodiment.

First, in step S901, functioning as the print execution module 138, the CPU 123 analyzes the print job received from the print control module 134 or the hold control module 137, and determines whether or not the print job is a print job that has been subjected to the preceding processing. If the CPU 123 determines that the print job has the identifier information 801, it is determined that the print job has been subjected to the preceding processing, and the processing advances to step S902. On the other hand, if the identifier information 801 is not present, it is determined that the print job has not been subjected to the preceding processing, and the processing advances to step S908.

In step S902, functioning as the print execution module 138, the CPU 123 determines whether or not a target page of the print job analyzed in this manner is a page subjected to the preceding processing. If the target page is present in the preceding processing information 802 of the print job, the processing advances to step S903, and if not, the processing advances to step S908.

In the case of the print job illustrated in FIG. 8, the first and second pages are present in the preceding processing information 802. As such, the CPU 123 determines that the first and second pages are pages that have been subjected to the preceding processing.

The processing of step S903 to step S905 will be described next with reference to FIG. 10A.

FIG. 10A is a diagram illustrating the flow of processing in a case in which a page to be analyzed has already been subjected to the preceding processing.

In step S903, functioning as the print execution module 138, the CPU 123 notifies the PDL analyzing module 139 that page analysis is to be "skipped". Accordingly, the PDL analyzing module 139 skips the analysis processing of the target page, and prepares for the analysis processing of the next page without making any notification to the intermediate data generation module 140. The print execution module 138 notifies the PDL analyzing module 139 that the page analysis is to be "skipped" at this time in order to improve the performance of the print processing. If the print execution module 138 notifies the PDL analyzing module 139 that the analysis is to be "started" rather than "skipped", the PDL analyzing module 139 will repeat the analysis processing carried out in the preceding processing by the preceding processing module 136.

The process then advances to step S904, in which functioning as the print execution module 138, the CPU 123 notifies the intermediate data generation module 140 of the preceding processing result information 803 of the page being analyzed.

In the print job example illustrated in FIG. 8, if the page being analyzed is the first page, the CPU 123 notifies the intermediate data generation module 140 of the preceding processing results stored at the file path "/xxx/yyy/1/image1" (a RIP image of the first page).

There are two advantages to the print execution module 138 notifying the intermediate data generation module 140 of the preceding processing results without going through the PDL analyzing module 139. The first advantage is that the number of processing steps can be reduced, which increases the processing speed. The second advantage is that the cost of developing the software modules can be suppressed. This will be described in detail hereafter using FIG. 10C.

FIG. 10C is a diagram illustrating the flow of processing by the print execution module 138, the PDL analyzing module 139, and the intermediate data generation module 140.

As illustrated in FIG. 10C, the print execution module 138 includes a PDL determination module 138-1, and controls a plurality of PDL analyzing modules 139a, 139b, and 139c. The PDL analyzing module 139a is a PDL analyzing module that analyzes an LBP Image Processing System (LIPS®), for example. The PDL analyzing module 139b is a PDL analyzing module that analyzes PostScript (PS®). The PDL analyzing module 139c is a PDL analyzing module that analyzes XML Paper Specification (XPS®). If the PDL analysis is not skipped, the print execution module 138 determines the PDL included in the print job using the PDL determination module 138-1, and makes the necessary notification to the LIPS® analyzing module 139a, if LIPS®, to the PS® analyzing module 139b, if PS®, and to the XPS® analyzing module 139c, if XPS®. If the print execution module 138 notifies the PDL analyzing modules 139a, 139b, and 139c of the preceding processing results, it is further necessary for the PDL analyzing modules 139a, 139b, and 139c to handle notifications to the intermediate data generation module 140. Such measures first increase the number of processing steps, which slows the processing speed. Having each of the plurality of PDL analyzing modules 139a, 139b, and 139c take such measures also increases the cost of developing the software modules. Thus, using a configuration in which the print execution module 138 notifies the intermediate data generation module 140 of the preceding processing results directly, as in the first embodiment, makes it possible to achieve effects of increasing the processing speed and suppressing the development costs. The PDL analyzing module 139 may be realized by hardware, in which case the benefit of this configuration, in terms of development cost, is more marked.

In step S905, functioning as the intermediate data generation module 140, the CPU 123 generates the intermediate data from the preceding processing results notified from the print execution module 138 in step S904. In other words, the CPU 123 obtains the image data of the page from the file path corresponding to the preceding processing results, and generates the intermediate data using the image data. The processing of step S903 to step S905 makes it possible to greatly reduce the time required to generate the intermediate data, compared to a case in which the PDL analyzing module 139 analyzes the PDL data and the intermediate data generation module 140 generates the intermediate data on the basis of the analysis result, as in step S908 to step S910, which will be described later.

The processing then advances to step S906, in which functioning as the print execution module 138, the CPU 123 controls the RIP 128 to render the generated intermediate data and causes the print mechanism 111 to execute the print processing. The processing then advances to step S907, in which the CPU 123 determines whether all pages in the print job have been analyzed. If it is determined that not all pages have been analyzed, the processing returns to step S901, in which the print execution processing proceeds to the next page. On the other hand, if it is determined that all pages have been analyzed, the processing illustrated in this flowchart ends.

Processing carried out when it is determined in step S902 that the page being analyzed is a page not yet subjected to the preceding processing (step S908 to step S910) will be described next with reference to FIG. 10B. The processing of step S908 to step S910 is a typical process of deploying print data, and will, therefore, be discussed only briefly.

FIG. 10B is a diagram illustrating the flow of processing when the page being analyzed has not yet undergone the preceding processing. This is basically the same as conventional processing.

In step S908, functioning as the print execution module 138, the CPU 123 notifies the PDL analyzing module 139 that the analysis of the page to be analyzed is to start. The processing then advances to step S909, in which functioning as the PDL analyzing module 139, the CPU 123 analyzes the PDL data of the page being analyzed, and notifies the intermediate data generation module 140 of the result of that analysis. The processing then advances to step S910, in which functioning as the intermediate data generation module 140, the CPU 123 generates intermediate data from the analysis result from the PDL analyzing module 139. The processing then advances to step S906, and then on to step S907, after which the processing ends.

According to the first embodiment as described thus far, the availability of resources required for the preceding processing, such as the HDD, the memory, the CPU, and so on, is confirmed. If the necessary resources are available, the preceding rendering processing is carried out sequentially on the print jobs currently held, and the processing results are stored in a storage device. If the user has made a print instruction for a print job being held, the image forming apparatus 101 adds stored information indicating the rendering processing results to the print job. Furthermore, when printing, the image forming apparatus 101 executes the rendering processing using the information indicating the rendering processing results added to the print job. The image forming apparatus 101 implements the preceding processing for held print jobs in this manner, and by adding the information indicating the preceding processing results to the print job at the time of printing and then referring to the information of the preceding processing result during the rendering processing, the amount of time required for the rendering processing can be reduced. This makes it possible to reduce the user's wait time after making the print instruction.

Furthermore, according to the first embodiment, the PDL data itself included in the print job is not edited. Rather, the preceding processing results are added to the PDL data. Accordingly, even PDL data that is difficult to edit, such as a portable document format (PDF), can be handled with ease.

The foregoing describes an example in which the format is set to "file path", and information of the file path in the HDD 124 in which the preceding processing results are stored is added as the information indicating the preceding processing results. This reduces wasteful memory copies of the image data and conserves memory resources. The format may, however, be set to "image", and the image data, which is the preceding processing result itself, may be added as the information indicating the preceding processing results.

Second Embodiment

A second embodiment of the present invention will be described next. Note that the system configuration, the hardware configuration of the image forming apparatuses 101 to 103, and so on according to the second embodiment are the same as those described above in the first embodiment, and thus, descriptions thereof will be omitted.

The second embodiment describes an example in which the image forming apparatus 101 has a server function, and a user instructs the image forming apparatus 102 (or 103) to print after the image forming apparatus 101 has received the print job from the PC 104. In the following, configurations that are the same as those in the first embodiment will not be described, and the descriptions will focus on the differences from the first embodiment.

FIG. 11 is a sequence chart for describing an example of a print processing sequence carried out in the print system according to the second embodiment. Note that the processing executed by the image forming apparatus 101, 102, or 103 in FIG. 11 is realized by the CPU 123 of the image forming apparatus 101, 102, or 103 deploying programs in the RAM 125 and executing those programs. Additionally, the processing executed by the PC 104 in FIG. 11 is realized by a CPU (not shown) of the PC 104 deploying programs in the RAM 125, and executing those programs.

First, the processing of step S1101 to step S1110 is, similarly to the processing of step S201 to step S210 of FIG. 2, processing for holding a print job in the image forming apparatus 101, and will, therefore, not be described here. The processing from step S1110 on, carried out by the image forming apparatuses 102 and 103, will be described using the image forming apparatus 102 as an example, but the processing is the same for the image forming apparatus 103 as well.

Once the user has logged into the image forming apparatus 102 in S1111, the image forming apparatus 102 obtains the user information of the user in S1112. Then, in step S1113, the image forming apparatus 102 issues, to the image forming apparatus 101 functioning as a server, a request to obtain a list of the bibliographic information of the user. Upon receiving the request to obtain the list of bibliographic information, the image forming apparatus 101 sends the list of the bibliographic information of the user to the image forming apparatus 102 in step S1114. Upon receiving the list of bibliographic information from the image forming apparatus 101, in step S1115, the image forming apparatus 102 displays a list of the user's print jobs on the operation panel 113 on the basis of the list of bibliographic information. Then, upon receiving a print instruction from the user in step S1116, the image forming apparatus 102 issues a request to obtain the print job corresponding to the print instruction to the image forming apparatus 101 in step S1117. Then, in step S1118, the image forming apparatus 101 adds the preceding processing results saved in step S1110 to the print job, in accordance with the obtainment request. Then, in step S1119, the image forming apparatus 101 sends the processed print job, to which the preceding processing results have been added, to the image forming apparatus 102. Upon receiving the print job to which the preceding processing results have been added, in step S1120, the image forming apparatus 102 carries out the rendering processing for finishing using the preceding processing results of that print job, and then prints on the basis of the print job in step S1121.

Figure 12:
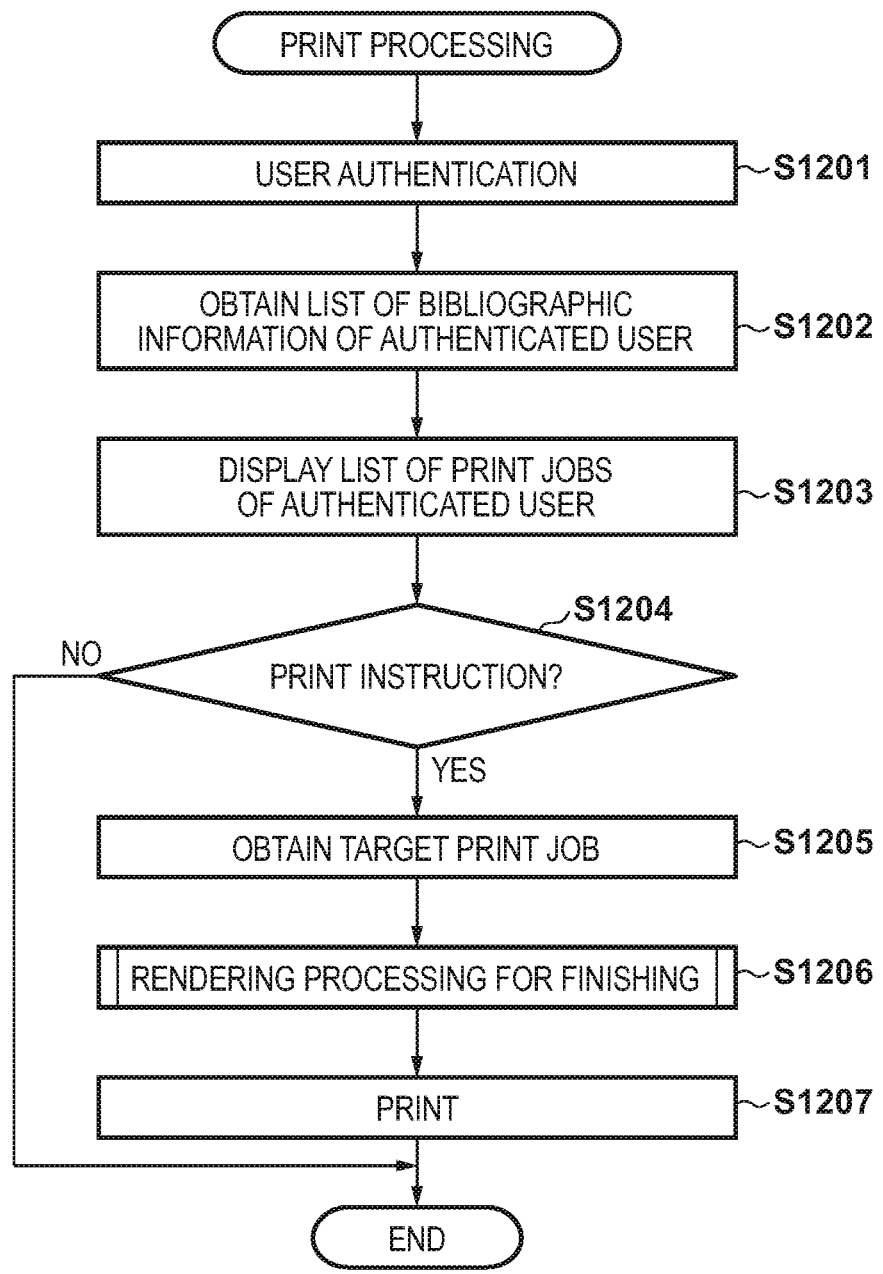
FIG. 12 is a flowchart for describing processing carried out when a print job selected by a logged-in user is executed by an image forming apparatus according to the second embodiment.

FIG. 12 is a flowchart for describing processing carried out when a print job selected by a logged-in user is executed by the image forming apparatus 102 according to the second embodiment. Note that the processing illustrated in this flowchart is realized by the CPU 123 of the image forming apparatus 102 executing programs deployed in the RAM 125 from the HDD 124.

First, step S1201 is the same processing as that of step S601 in FIG. 6, and thus, will not be described. The processing then advances to step S1202, in which the CPU 123 makes a request, to the image forming apparatus having the server function (the image forming apparatus 101, in the second embodiment), for the bibliographic information corresponding to the user information obtained in step S1201, and obtains the list of bibliographic information. The processing then advances to step S1203, wherein, like step S602 of FIG. 6, the CPU 123 generates a list of print jobs on the basis of the bibliographic information obtained in step S1202, and displays the list on the operation panel 113 via the panel I/F 122. The information displayed on the operation panel 113 is, for example, the information illustrated in FIG. 17, and the print job list is displayed as indicated by 1701, for example.

The processing then advances to step S1204, in which, similarly to step S603 of FIG. 6, the CPU 123 determines whether or not a print instruction has been made by the user for a print job displayed in the print job list 1701. If it is determined that the print instruction has not been made, the processing ends. On the other hand, if it is determined in step S1204 that the print instruction has been made, the processing advances to step S1205. In step S1205, the CPU 123 makes a request, to the image forming apparatus 101 having a server function, for the print job corresponding to the print instruction, and obtains the print job. The processing then advances to step S1206, in which the CPU 123 executes the rendering processing for finishing. Here, if the preceding processing result information is not added to the print job, the same rendering processing for finishing as that carried out in step S303 of FIG. 3A is executed. The rendering processing for finishing if information indicating the preceding processing results is added to the print job will be described in detail later with reference to the flowchart in FIG. 16. The processing then advances to step S1207, in which the CPU 123 executes the print processing in the same manner as in step S304 of FIG. 3A. The processing then ends.

Figure 13:
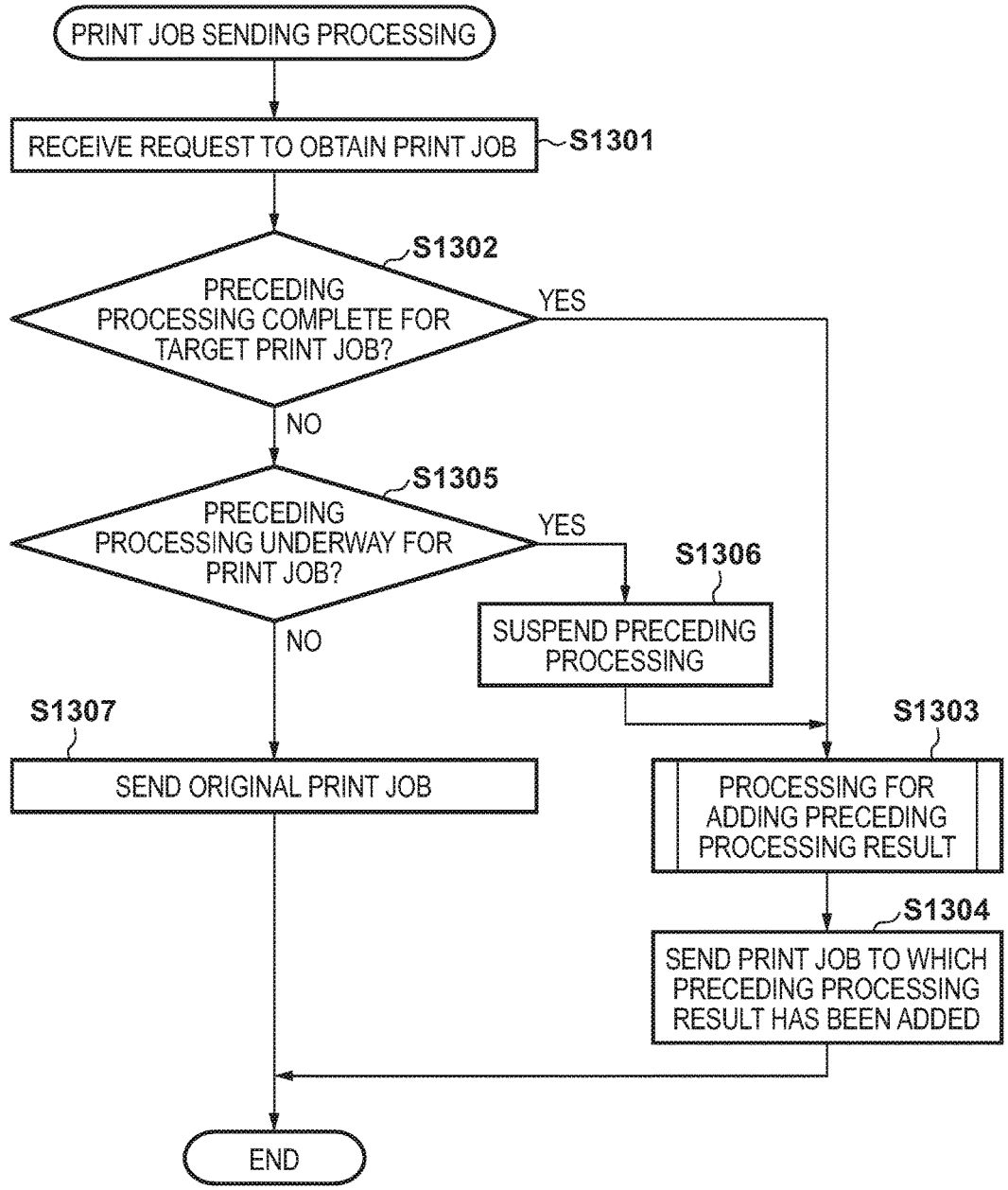
FIG. 13 is a flowchart for describing processing in which an image forming apparatus 101 having a server function sends a print job to an image forming apparatus 102 in response to a print job request from the image forming apparatus 102, according to the second embodiment.

FIG. 13 is a flowchart for describing processing in which the image forming apparatus 101 having the server function sends a print job to the image forming apparatus 102 in response to a print job request from the image forming apparatus 102, according to the second embodiment. Note that the processing illustrated in this flowchart is realized by the CPU 123 of the image forming apparatus 101 executing programs deployed in the RAM 125 from the HDD 124.

First, in step S1301, the CPU 123 receives a request to obtain a print job from the image forming apparatus 102 through the network I/F 120. The processing then advances to step S1302, in which the CPU 123 determines whether or not the preceding processing for the requested print job is complete. This determination is made by referring to the bibliographic information and obtaining the information indicating that preceding processing is complete, added in step S505 of FIG. 5. If, in step S1302, the CPU 123 determines that the preceding processing is complete for the print job, the processing advances to step S1303, and, if not, the processing advances to step S1305. In step S1303, the CPU 123 generates the print job by adding information indicating the preceding processing results to the PDL data. Details of the processing for adding the information indicating the preceding processing result will be given later with reference to FIG. 14. The processing then advances to step S1304, in which the CPU 123 sends, to the image forming apparatus 102 from which the request came, the print job to which the information indicating the preceding processing results has been added. The processing then ends.

On the other hand, if the CPU 123 has determined in step S1302 that the preceding processing for the print job is incomplete, the processing advances to step S1305. In step S1305, the CPU 123 determines whether or not the preceding processing is underway for the requested print job. This determination may be made by referring to the bibliographic information of the print job and confirming whether or not the preceding processing is underway, in a manner similar to step S1302, or by confirming whether or not image data already subjected to the preceding rendering processing associated with the bibliographic information in step S503 of FIG. 5 is present. If the CPU 123 has determined in step S1305 that the preceding processing for the requested print job is underway, the processing advances to step S1306. In step S1306, the CPU 123 suspends the preceding processing for the print job for which the preceding processing is underway. The information of the suspended preceding processing is used to determine whether or not the print instruction has been made, in step S506 of FIG. 5. In step S1306, the CPU 123 obtains the information indicating the preceding processing results saved in the HDD 124 at the point in time when the preceding processing was suspended (the image data associated with the corresponding bibliographic information in step S503 of FIG. 5) as the preceding processing information. Then, in step S1303, the CPU 123 adds the preceding processing information to the print job. Then, in step S1304, the CPU 123 sends the processed print job, to which the preceding processing information has been added, to the image forming apparatus 102 from which the request came. The processing then ends.

On the other hand, if, in step S1305, the CPU 123 has determined that the preceding processing is not underway for the requested print job, the processing advances to step S1307, in which the print job is sent to the image forming apparatus 102 from which the request came. The processing then ends.

Figure 14:
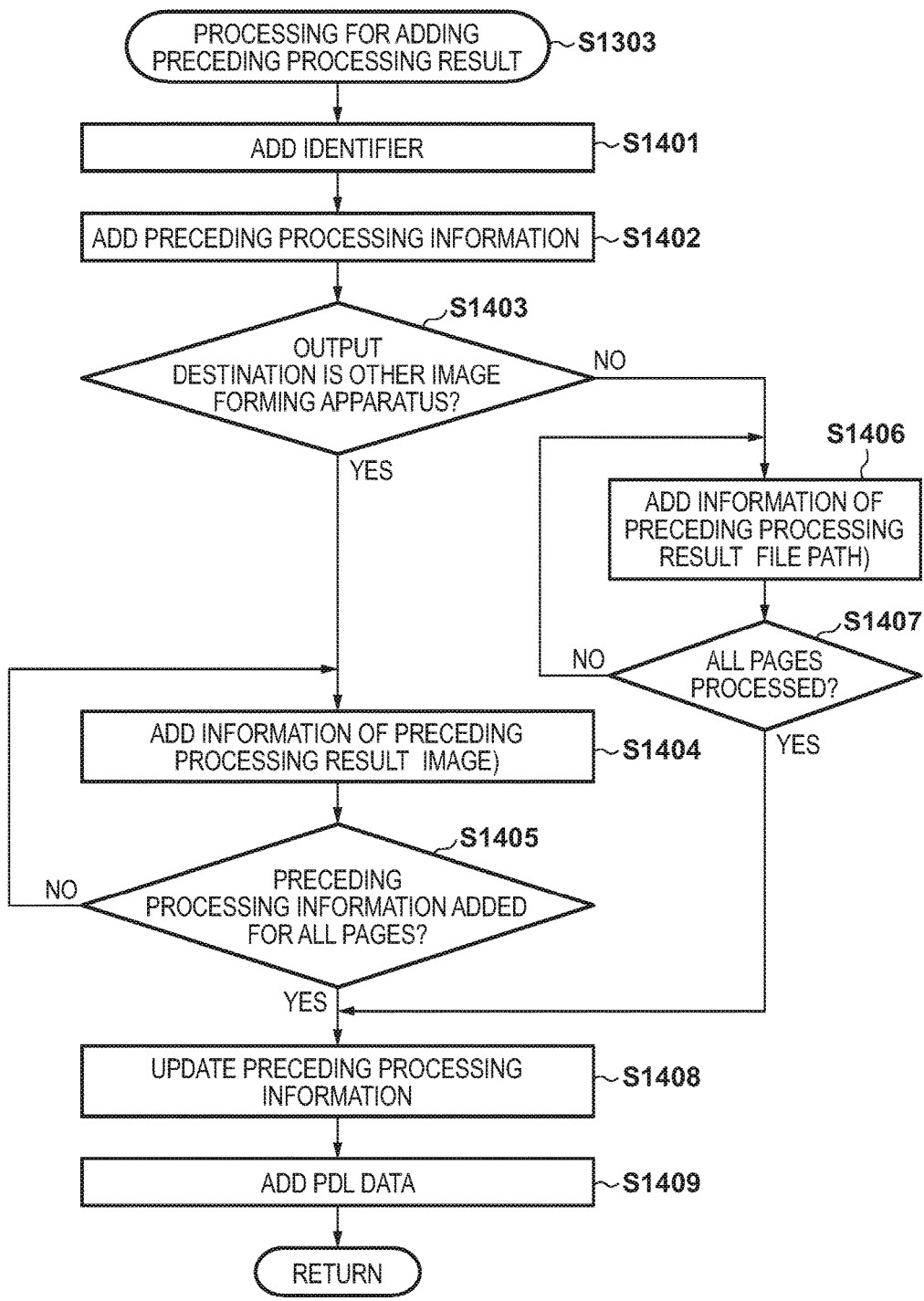
FIG. 14 is a flowchart for describing processing in step S1303 of FIG. 13, carried out by an image forming apparatus according to the second embodiment.

FIG. 14 is a flowchart for describing processing for adding the information indicating the preceding processing results in step S1303 of FIG. 13, carried out by the image forming apparatus 101 according to the second embodiment.

Figure 15:
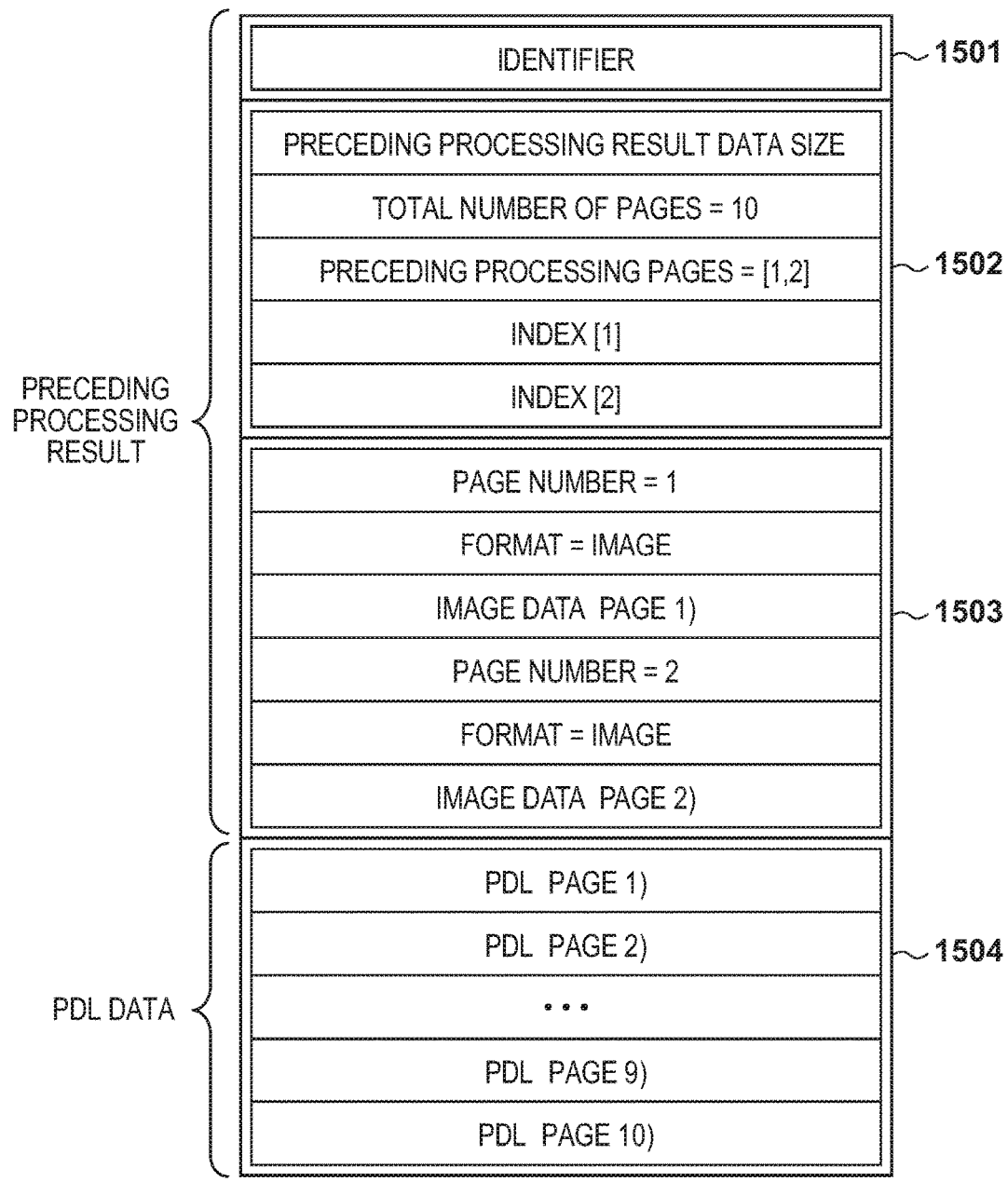
FIG. 15 is a diagram illustrating an example of a print job to which information indicating preceding processing results has been added, in the image forming apparatus according to the second embodiment.

FIG. 15 is a diagram illustrating an example of a print job to which information indicating the preceding processing results has been added, in the image forming apparatus 101 according to the second embodiment.

In FIG. 15, similarly to FIG. 8, identifier information 1501 is added to the beginning, after which preceding processing information 1502, preceding processing result information 1503, and the original PDL data 1504 continue. Here, too, the preceding processing is complete for the first and second of 10 pages. Although the preceding processing result information is a file path in FIG. 8, however, the preceding processing result information 1503 is image data in FIG. 15.

First, in step S1401, the CPU 123 adds the identifier information 1501 (FIG. 15) to the PDL data as the start of the processing for adding the preceding processing results. The details of the processing for adding this identifier information 1501 are the same as in step S701 of FIG. 7. The process then advances to step S1402, in which the CPU 123 adds the preceding processing information 1502 (FIG. 15) after the identifier information added in step S1401. The basic processing, such as the addition of the preceding processing information, and the like, is the same as in step S702 in FIG. 7.

The processing then advances to step S1403, in which the CPU 123 determines which image forming apparatus is the output destination of the target print job. In the example illustrated in FIG. 13, the processing is carried out in response to a request to obtain a print job from an external image forming apparatus, and thus, the image forming apparatus can be determined to be another image forming apparatus. Additionally, in the example illustrated in the first embodiment, it is determined that the print job is to be output by the image forming apparatus 101 that holds the print job (that is, not by another image forming apparatus). If, in step S1403, the CPU 123 determines that the output destination of the print job is another image forming apparatus, the processing advances to step S1404, and, if not, the processing advances to step S1406.

In step S1404, the CPU 123 adds the preceding processing result information 1503 (FIG. 15) after the preceding processing information 1502 added in step S1402. Here, information of the page number of the preceding processing results, the format, and information of the preceding processing results are added as a single set. In the example indicated by 1503 in FIG. 15, information of the set is first added to the first page, and the format of the preceding processing result is set to "image". If the format is "image", the image data is loaded from the HDD 124 in which the preceding processing results are stored, and is added as preceding processing result information. The processing then advances to step S1405, in which the CPU 123 determines whether or not the information of all pages for which the preceding processing is complete has been added. If it is determined that the information of all pages for which the preceding processing is complete has not been added, the processing returns to step S1404, and the next page is processed. If the information of all pages for which the preceding processing is complete has been added, the processing advances to step S1408.

On the other hand, the processing of step S1406 and step S1407, carried out if it is determined that the output destination of the print job is not another image forming apparatus, is the same processing as that carried out in step S703 and step S704 of FIG. 7. In other words, the file path in which the print job is stored in the image forming apparatus is added as the preceding processing result information, after which the processing advances to step S1408. The processing of step S1408 and step S1409 is the same as the processing of step S705 and step S706 in FIG. 7, and will, therefore, not be described.

The flowchart in FIG. 14 illustrates a configuration in which the output destination of the print job is determined in step S1403, and the image data or the file path is added in accordance with the output destination. The present invention is not, however, limited to this configuration, and the image data may be added by executing step S1404 and step S1405, without making the determination in step S1403, for example. Alternatively, the file path may be added by executing step S1406 and step S1407, without making the determination in step S1403. For example, the image data may be stored in a shared folder that can be accessed by another image forming apparatus over the LAN 105, and a uniform resource locator (URL) pointing to that image data may be added as the file path.

Figure 16:
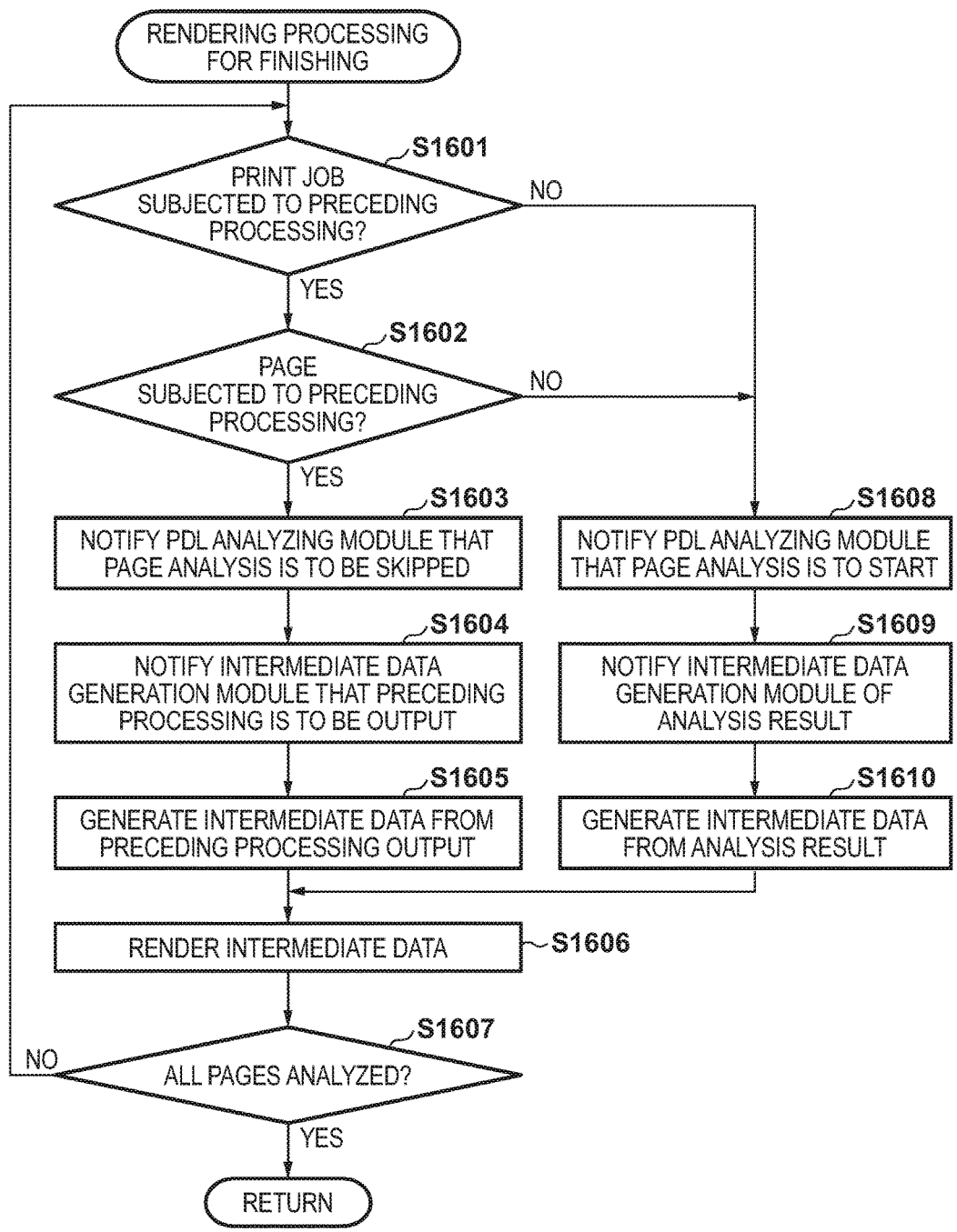
FIG. 16 is a flowchart for describing rendering processing for finishing carried out in step S1206 of FIG. 12, carried out by the image forming apparatus according to the second embodiment.

FIG. 16 is a flowchart for describing rendering processing for finishing carried out in step S1206 of FIG. 12, carried out by the image forming apparatus 102 according to the second embodiment. The processing of each step in FIG. 16 is similar to the processing in FIG. 9, and thus, the processing will not be described in detail.

In step S1604, functioning as the print execution module 138, the CPU 123 notifies the intermediate data generation module 140 of the preceding processing result information 1503 of the target page.

In the example of the print job illustrated in FIG. 15, if the page being analyzed is the first page, the intermediate data generation module 140 is notified of the image data (a RIP image of the first page) added to the print job as the preceding processing result.

According to the second embodiment, as described thus far, the preceding processing can be realized for print jobs held in the image forming apparatus 101, which has a server function. By logging into another image forming apparatus (e.g., the image forming apparatus 102) and making a print instruction, the user can obtain a print job from the image forming apparatus 101 and print the print job. At this time, the image forming apparatus 101, which functions as a server, determines whether the output destination of the print job is the image forming apparatus 101 itself or another image forming apparatus, and can switch the method of adding information indicating the preceding processing results in accordance with the result of the determination. If the output destination is another image forming apparatus, all of the preceding processing information is communicated by including an actual image in the preceding processing results. On the other hand, if the output destination is the image forming apparatus 101 itself, only the file path is communicated, and, by referring to the file path during the rendering processing for finishing, the preceding processing result can be referred to in an efficient manner. Thus, in either situation, the information indicating the preceding processing results can be referred to during the rendering processing for finishing, which makes it possible to reduce the user's wait time after making the print instruction.

In the first and second embodiments, the rendering processing is carried out in advance while the image forming apparatus holds a print job. Specifically, the image forming apparatus carries out the rendering processing in advance while holding the print job, and stores information indicating the results in a storage device. Then, when the user makes a print instruction for a held print job, the stored information of the rendering processing results is added to the print job. By using the information of the rendering processing results, added to the print job by the image forming apparatus, at the time of printing, the amount of time required for the rendering processing can be reduced during printing. Thus, the image forming apparatus according to the first and second embodiments has a feature of using a result of the rendering processing, carried out in advance, at the time of printing, and carrying out the rendering processing at the time of printing. Thus, in hold printing, the amount of time from when the user makes a print instruction to when the printing is started can be reduced, and the amount of time until the user obtains the printed material can be reduced, as well.

Although the second embodiment describes a configuration in which the image forming apparatus 101, which has a server function, carries out the preceding processing and adds information indicating the preceding processing results, the configuration may be such that these functions of the image forming apparatus 101 are realized by a print server.

Third Embodiment

A third embodiment of the present invention will be described next. Note that the system configuration, the hardware configuration of the image forming apparatuses 101 to 103, and so on, according to the third embodiment are the same as those described above in the first embodiment, and thus, descriptions thereof will be omitted.

In the above-described first and second embodiments, the original print settings of the print job being processed are obtained in step S403 of FIG. 4, and the preceding processing is carried out on the basis thereof. A desired print job may, however, for example, be selected from the print job list 1701 in FIG. 17, and the print settings of the selected print job may be changed by pressing the print settings button 1703. The selected print job may then be printed. In this case, the print settings are not finalized until the user presses the print start button 1702 to instruct the printing to start. Accordingly, if the preceding processing is carried out on the basis of the original print settings of the print job, and the print settings of the print job have been changed, the information of the preceding processing can no longer be used. As such, the amount of time required until the print is output cannot be reduced.

To respond to this issue, the third embodiment describes an example in which preceding processing based on print settings that are likely to be changed is carried out in addition to the preceding processing based on the original print settings of the print job.

FIG. 20 is a diagram illustrating an example of a print job to which information indicating the preceding processing results has been added, in the image forming apparatus 101 according to the third embodiment. Note that parts that are the same as those in FIG. 8, described in the first embodiment, are given the same reference signs, and descriptions thereof will not be given.

Reference numeral 2001 designates preceding processing information, corresponding to 802 in FIG. 8. In the third embodiment, a plurality of preceding processes are carried out, and thus, the number of times the preceding processing is carried out (corresponding to "preceding processing number=2") is added. A corresponding number of pieces of information pertaining to the preceding processing are added as well. Note that depending on the print settings, such as a layout of "2 in 1", the preceding processing results may have a different number of pages (physical number of pages) from the number of pages specified in the PDL data (logical number of pages), and thus, the physical number of pages may be stored.

Reference numeral 2002 denotes information indicating preceding processing results, corresponding to 803 in FIG. 8. In the third embodiment, a plurality of preceding processes are carried out, and thus, information indicating each preceding processing result is added, in accordance with the number of times the preceding processing has been carried out. In the example illustrated in FIG. 20, the print job includes ten pages of PDL data. In first preceding processing, which is based on first print settings, ten pages of image data, corresponding to each page of PDL data, are generated, and the information indicating that preceding processing results is added. Then, in second preceding processing based on second print settings, five pages of image data are generated from the ten pages of PDL data, and the information indicating the preceding processing results is added.

Note that in the third embodiment, the "format" may be set to "image" in the preceding processing results of FIG. 8, and the image data, which is the preceding processing result, may then be provided, as indicated in FIG. 15 and described in the second embodiment.

Figure 18:
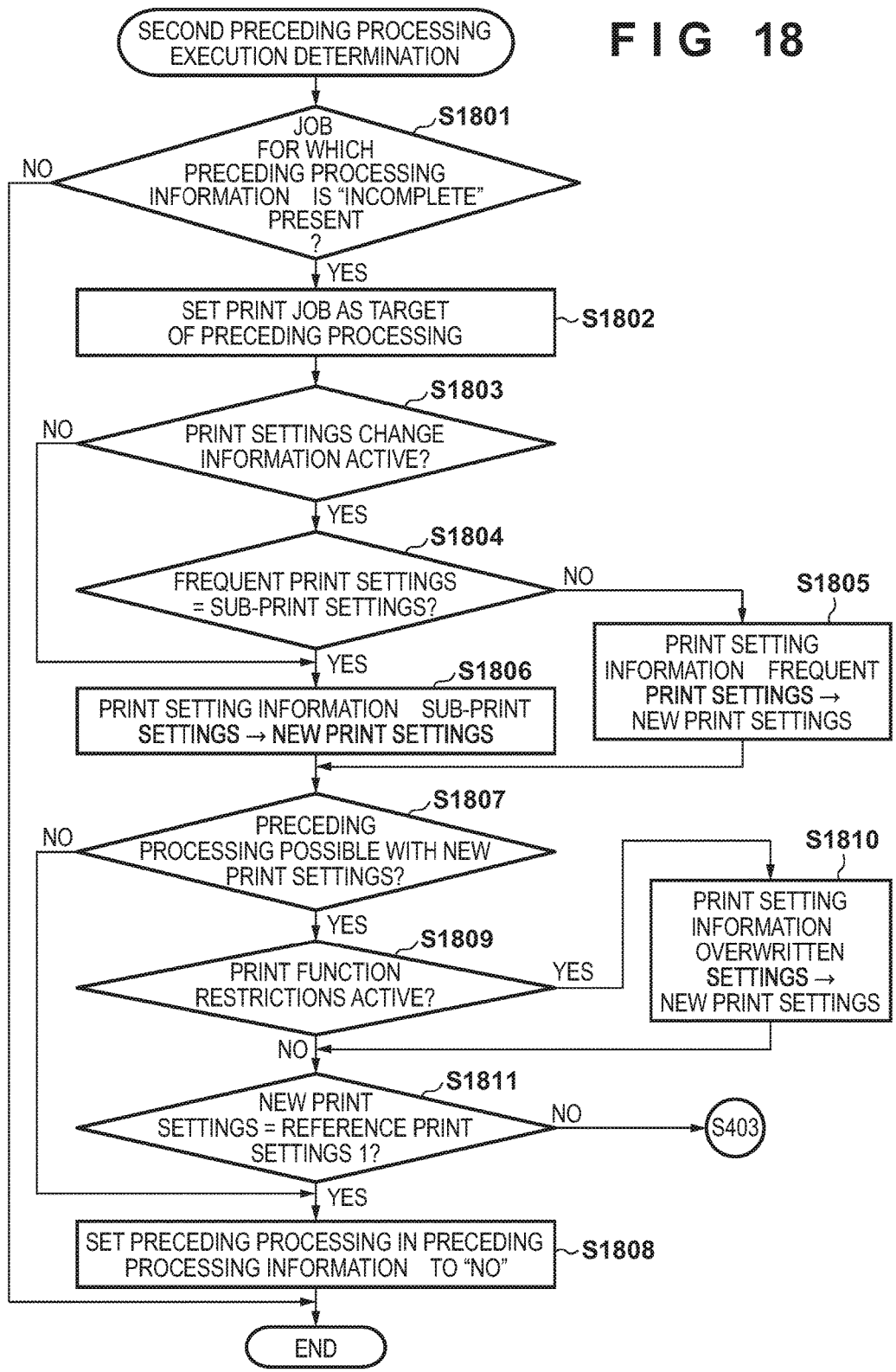
FIG. 18 is a flowchart for describing processing for determining whether or not to carry out second preceding processing on a print job for which first preceding processing by an image forming apparatus is complete, according to a third embodiment.

FIG. 18 is a flowchart for describing processing for determining whether or not to carry out the second preced-
ing processing on a print job for which the first preceding processing by the image forming apparatus 101 is complete, according to the third embodiment. Note that the processing illustrated in this flowchart is realized by the CPU 123 of the image forming apparatus 101 executing programs deployed in the RAM 125 from the HDD 124. Note that this processing is executed when, in the first preceding processing execution determination of step S401 in FIG. 4, it is determined that there is no job for which the preceding processing is "incomplete". In other words, this processing is executed when the first preceding processing using the print settings set at the time of job reception is complete for all of the jobs, and is processing for determining whether or not to execute the second preceding processing.

FIG. 19A is a diagram illustrating sub-print setting information according to the third embodiment, FIG. 19B is a diagram illustrating print settings changed information of the user A. FIG. 19C is a diagram illustrating an example of the bibliographic information of the user A, and FIG. 19D is a diagram illustrating an example of print function limitations.

FIG. 19A illustrates sub-print settings, which can be set by an administrator, or the like, in advance, and which are referred to starting with the second preceding processing carried out by the image forming apparatus 101. In FIG. 19A, "layout" is provided as a settings item in the sub-print setting information, and the value thereof is set to "2 in 1".

FIG. 19B illustrates print settings change information indicating the number of times each settings item has been changed in the print settings thus far by the user A. In FIG. 19B, "color mode", "print mode", and "layout" are indicated as settings items, and values of "BW (black and white)", "double-sided", and "2 and 1" are set for those items, respectively. The number of times each setting has changed is also recorded.

FIG. 19C illustrates an example in which the print settings referred to in the first preceding processing, and the result of that processing, as well as the print settings referred to in the second preceding processing, and the printing result thereof, are stored for the bibliographic information of the user A. The print settings change information indicates a difference between the print settings included in the print job at the time of job reception (corresponding to the "print setting information" in the bibliographic information of the user A in FIG. 19C) and the current print settings, when a print instruction has been made (S214 in FIG. 2). The number of times each print settings item has been changed can be recorded by increasing the number of times the change has been made by one for each settings item in which there is a difference.

First, in step S1801 of FIG. 18, the CPU 123 determines whether or not there is a print job for which the preceding processing is "incomplete" in preceding processing information 2 indicated in FIG. 19C. This processing ends if there is no such print job. If, in step S1801, the CPU 123 determines that there is a print job for which the preceding processing is "incomplete", the processing advances to step S1802, in which the print job is set as a target for the preceding processing. The processing then advances to step S1803. In step S1803, the CPU 123 determines whether or not the print settings change information, which records the number of times the print settings have been changed on a user-by-user basis as indicated in FIG. 19B, for example, is active. If the information is not active, the processing advances to step S1806, but, if the information is active, the processing advances to step S1804. Here, whether or not to use the print settings change information can be selected. If the print settings change information is not to be used, the preceding processing is carried out using settings in which the values in the print setting information of the print job are replaced with the value set by the sub-print setting information, such as that illustrated in FIG. 19A.

In step S1804, the CPU 123 refers to the print settings change information, such as that illustrated in FIG. 19B. A settings item for which the number of changes is greater than a predetermined value (corresponding to "color mode: BW", which has a circle in the "apply" column in FIG. 19B) is compared to a settings item set in the sub-print settings, such as those illustrated in FIG. 19A (corresponding to "layout: 2 in 1"). If these match, the processing advances to step S1806, but, if not, the processing advances to step S1805. In step S1806, the CPU 123 sets, as new print settings, print settings in which the print setting information of the print job have been overwritten with the settings values set by the sub-print settings in the bibliographic information of FIG. 19C. The processing then advances to step S1807. On the other hand, in step S1805, the CPU 123 sets, as the new print settings, print settings in which the print setting information of the print job in the bibliographic information of FIG. 19C have been overwritten with settings item values for which the frequency has changed. The processing then advances to step S1807.

This will be described in detail. For example, in the sub-print settings in FIG. 19A, a settings item of "layout" has a value of "2 in 1". Based on the print settings change information in FIG. 19B, however, it can be seen that the user A frequently changes the "color mode" settings item "BW", i.e., frequently changes the setting to black-and-white printing. Accordingly, a determination of "no" is made in step S1804, and the processing moves to step S1805, in which the print settings, in which the color mode of the print setting information in the bibliographic information has been changed to BW, are set as new print settings to be referred to in the second preceding processing.

In step S1807, the CPU 123 determines whether or not the preceding processing can be carried out with the new print settings set in step S1805 or step S1806. Assume, for example, that in the print setting information, "4 in 1" is designated for "layout", i.e., four pages of data is to be drawn on a single side of a printing target. In this case, it is possible that PDL data including image data in which four pages of data has been collected into a single page has been received. In such a case, it is determined whether "2 in 1" can be set, or that the preceding processing cannot be carried out because problems, such as jaggies, will arise due to enlargement/reduction processing, and the processing advances to step S1808. In step S1808, the CPU 123 sets the preceding processing to "no" for the preceding processing information 2 in the bibliographic information, ensuring that the second preceding processing will not be executed. The processing then ends.

If the CPU 123 has determined in step S1807 that the preceding processing can be carried out, the processing advances to step S1809, in which it is determined whether or not print function limitations, such as those illustrated in FIG. 19D, are active ("on" in FIG. 19D). The print function limitations can be set in advance by an administrator, or the like, in order to suppress printing costs, and the like. If it is determined that the print function limitations are not active, the processing advances to step S1811, but, if active, the processing advances to step S1810. In step S1810, the CPU 123 overwrites the new settings with items designated in the print function limitations as overwrite settings, after which the process advances to step S1811. For example, in FIG. 19D, "print mode: double-sided" is designated as an overwrite setting, and thus, the print mode will be double-sided even if "print mode: single-sided" is designated in the new print settings.

In step S1811, the CPU 123 determines whether or not the new print settings set through the processing carried out thus far are the same as the print settings set in step S403 of FIG. 4 and referred to in the first preceding processing (stored as reference print settings 1 in the bibliographic information). If the settings are the same, the preceding processing need not be repeated, and thus, the processing advances to step S1808, in which the preceding processing of the preceding processing information 2 in the bibliographic information is set to "no". On the other hand, if it is determined in step S1811 that the settings are not the same, the processing moves to step S403 in FIG. 4. Then, if it is determined that the resources necessary for the preceding processing in the image forming apparatus 101 are available, the second preceding processing is carried out using the new print settings. Note that the new print settings used in the second preceding processing, and the preceding processing results thereof are recorded in reference print settings 2 and the preceding processing information 2, respectively, in the bibliographic information, as indicated in FIG. 19C.

When a print instruction is then input, the CPU 123 refers to the bibliographic information. If there is print setting information matching the designated print settings, the print processing can be carried out using the preceding processing results obtained using those settings. For example, in the case of the bibliographic information illustrated in FIG. 19C, it is assumed that the user A has selected the print job with a job ID of "1", changed the color mode to BW in the print settings, and made a print instruction. In this case, the reference print settings 2 match the print settings designated in that print instruction (a color mode of "BW"), and thus, the print processing can be carried out using the preceding processing information 2 corresponding to the reference print settings 2.

Although the foregoing describes a situation in which there is one instance of the sub-print settings, it goes without saying that it is possible to prepare a plurality of sub-print settings, or to use a plurality of print settings changed frequently along with the sub-print settings (i.e., to carry out third preceding processing, fourth preceding processing, and so on).

According to the third embodiment as described thus far, second preceding processing based on print settings likely to be changed by the user who loaded a print job (sub-print settings) can be carried out in addition to first preceding processing based on the original print setting information of the print job. Thus, even if the print settings of a print job being held have been changed, the amount of time required to print the print job can be reduced.

The processing according to the third embodiment may be executed by the image forming apparatus 101 having a server function described above in the second embodiment.

Note that the structure and details of the above-described various types of data are not limited to those described here, and various structures and details may be used in accordance with the application or purpose.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:
at least one controller, having at least one processor which executes instructions stored in at least one memory and/or at least one circuitry, being configured:
(a) to receive a print job including print data wherein the print data in the print job is held in a storage, and print processing based on the held print data is not performed until a print instruction for the print job is input;
(b) to perform processing of rendering of at least one portion of the print data in the print job before the print instruction for the print job is input; and
(c) to perform print processing, after the print instruction for the print job is input, based on at least the print data rendered before the print instruction,
wherein, first rendered print data is generated based on the at least one portion of the print data and in a case in which print settings for the print job are changed from first print settings to second print settings, while the print job is held in the storage, second rendered print data is generated based on the at least one portion of the print data, the first rendered print data not being used for performing the print processing, and the second rendered print data being used for performing the print processing, and wherein the first rendered print data is generated in accordance with the first print settings, and the second rendered print data is generated based on the second print settings.

2. The printing apparatus according to claim 1, wherein, in the processing of rendering, the at least one controller renders the at least one portion of the print data in the print job on the basis of the second print settings likely to be changed by a user, in addition to the first print settings set in the print job.

3. The printing apparatus according to claim 2, wherein the at least one controller is configured (d) to record, on a user-by-user basis, a number of times a settings value in the print settings has been changed, and the second print settings are print settings for which the number of times the settings value has been changed is greater than a predetermined value.

4. The printing apparatus according to claim 1, wherein, in a case in which print data not yet subjected to the processing of rendering is present in the storage, and the printing apparatus has available resources, the at least one controller further executes the processing of rendering on the print data not yet subjected to the processing of the rendering.

5. The printing apparatus according to claim 4, wherein the available resources include at least one of available space for holding rendered print data, available memory, and available central processing unit (CPU) resources in the printing apparatus.

6. The printing apparatus according to claim 1, wherein, in a case in which the print instruction for the print job is received while the print data in the print job is being subjected to the processing of rendering, the at least one controller suspends the processing of rendering of the print data in the print job, and stores information of the print job subjected to the processing of rendering in the storage.

7. The printing apparatus according to claim 1, wherein the print instruction for the print job is a print instruction for a print job selected, by an authenticated user, from a displayed list of one or more print jobs held in the storage.

8. The printing apparatus according to claim 1, wherein the print job includes information of the print job subjected to the processing of rendering, which includes at least one of (i) a file path in which the rendered print data is held, and (ii) the rendered print data.

9. A print system comprising a server that receives a print job and holds the print job in a storage, and a printing apparatus that receives the print job from the server and prints the print job,
wherein the server comprises:
at least one controller, having at least one processor which executes instructions stored in at least one memory and/or at least one circuitry, being configured:
(a) to receive a print job including print data wherein the print data in the print job is held in a storage, and print processing based on the held print data is not performed until a print instruction for the print job is input;
(b) to perform processing of rendering of at least one portion of the print data in the print job before the print instruction for the print job is input;
(c) to send a list of one or more print jobs, stored in the storage, to the printing apparatus in response to a request from the printing apparatus; and
(d) to process, upon receiving, from the printing apparatus, a print instruction for a print job selected from the list of one or more print jobs, print data of the print job designated in the print instruction, on the basis of the information of at least the rendered print data, and to send the processed data to the printing apparatus,
wherein, first rendered print data is generated based on the at least one portion of the print data and in a case in which print settings for the print job are changed from first print settings to second print settings, while the print job is held in the storage, second rendered print data is generated based on the at least one portion of the print data, the first rendered print data not being used for performing the print processing, and the second rendered print data being used for performing the print processing, and wherein the first rendered print data is generated in accordance with the first print settings, and the second rendered print data is generated based on the second print settings, and wherein the printing apparatus comprises:

at least one controller, having at least one processor which executes instructions stored in at least one memory and/or at least one circuitry, being configured:

(a) to display the list of one or more print jobs sent from the server;

(b) to send, to the server, the print instruction for a print job selected by the authenticated user from the displayed list of one or more print jobs; and (c) to carry out printing based on the print job, on the basis of the processed data sent from the server.

10. The print system according to claim 9, wherein, in the processing of rendering, the at least one controller of the server renders the at least one portion of the print data in the print job on the basis of the second print settings, likely to be changed by a user, in addition to the first print settings set in the print job.

11. The print system according to claim 9, wherein, in a case in which print data not yet subjected to the processing of rendering is present in the storage and the printing apparatus has available resources, the at least one controller of the server further executes the processing of rendering on the print data not yet subjected to the processing of rendering.

12. The print system according to claim 11, wherein the available resources include at least one of available space for holding rendered data, available memory, and available central processing unit (CPU) resources in the server.

13. The print system according to claim 9, wherein, in a case in which the print instruction for the print job is received while the print data in the print job is being subjected to the processing of rendering, the at least one controller of the server suspends the processing of rendering of the print data in the print job, and stores information of the print job subjected to the processing of rendering in the storage.

14. A method of controlling a printing apparatus having a storage, the method comprising:

receiving a print job including print data wherein the print data in the print job is held in a storage, and print processing based on the held print data is not performed until a print instruction for the print job is input;

performing processing of rendering of at least a portion of the print data in the print job before the print instruction for the print job is input; and performing print processing, after the print instruction for the print job is input, based on at least the print data rendered before the print instruction, wherein, first rendered print data is generated based on the at least one portion of the print data and in a case in which print settings for the print job are changed from first print settings to second print settings, while the print job is held in the storage, second rendered print data is generated based on the at least one portion of the print data, the first rendered print data not being used for performing the print processing, and the second rendered print data being used for performing the print processing, and wherein the first rendered print data is generated in accordance with the first print settings, and the second rendered print data is generated based on the second print settings.

15. A non-transitory computer readable storage medium storing a program for causing a processor to execute a method of controlling a printing apparatus having a storage, the method comprising:

receiving a print job including print data wherein the print data in the print job is held in a storage, and print processing based on the held print data is not performed until a print instruction for the print job is input;

performing processing of rendering of at least a portion of the print data in the print job before the print instruction for the print job is input; and performing print processing, after the print instruction for the print job is input, based on at least the print data rendered before the print instruction, wherein, first rendered print data is generated based on the at least one portion of the print data and in a case in which print settings for the print job are changed from first print settings to second print settings, while the print job is held in the storage, second rendered print data is generated based on the at least one portion of the print data, the first rendered print data not being used for performing the print processing, and the second rendered print data being used for performing the print processing, and wherein the first rendered print data is generated in accordance with the first print settings, and the second rendered print data is generated based on the second print settings.

* * * * *